United States Patent [19]
Taoka et al.

[11] Patent Number: 5,657,453
[45] Date of Patent: Aug. 12, 1997

[54] SUCCESSIVELY-DECIDING PRODUCTION PLANNING SYSTEM

[75] Inventors: Tsuneo Taoka; Masahiro Megata; Masayasu Miki, all of Hyogo-ken, Japan

[73] Assignee: Mitsubishi Denki Kabishiki Kaisha, Tokyo, Japan

[21] Appl. No.: 16,137

[22] Filed: Feb. 10, 1993

[30] Foreign Application Priority Data

Feb. 14, 1992 [JP] Japan .................................. 4-059796

[51] Int. Cl.$^6$ .................................. G06F 17/60; G06G 7/52
[52] U.S. Cl. .................................. 395/201; 395/207; 395/208; 395/210; 395/228; 395/229
[58] Field of Search .................................. 364/400, 401, 364/468, 402; 395/201, 208, 207, 210, 228, 229

[56] References Cited

U.S. PATENT DOCUMENTS

| | | | |
|---|---|---|---|
| 4,888,692 | 12/1989 | Gupta et al. | 364/402 |
| 5,231,567 | 7/1993 | Matoba et al. | 364/401 |
| 5,260,868 | 11/1993 | Gupta et al. | 364/402 |
| 5,268,838 | 12/1993 | Ito | 364/401 |
| 5,278,750 | 1/1994 | Kaneko et al. | 364/401 |

FOREIGN PATENT DOCUMENTS 62-251051  4/1986  Japan .

OTHER PUBLICATIONS

IEEE Workshop on Artificial Intelligence for Industrial Applications 1988, IEEE Catalogue No. 88C#2529–6/88/0000–0219, Kanai et al., "An Expert System to Assist Production Planning", pp. 219–224.

Primary Examiner—Gail O. Hayes
Assistant Examiner—Junghoon Kenneth Oh
Attorney, Agent, or Firm—Wolf, Greenfield & Sacks, P.C.

[57] ABSTRACT

To obtain a production planning system permitting an allowance of the accuracy of production designation information between preceding and following production plans in order to follow the fluctuation of product demand forecast and received orders, a time frame comprising a series of time buckets from T1 to Tn in which the production quantity and the fluctuation width of type of product become more rough for further portion of a production plan are generated and a product quantity and type of product at a certain planned point of time are allocated to each of the time buckets from T1 to Tn. As a production period comes nearer, the time buckets are finely divided and recombined to successively decide planned production quantity and type of product. In this case, an executable production designation is automatically generated by referring to a condition storing module 3 which stores the conditions for dividing and recombining the quantity and type of product.

49 Claims, 25 Drawing Sheets

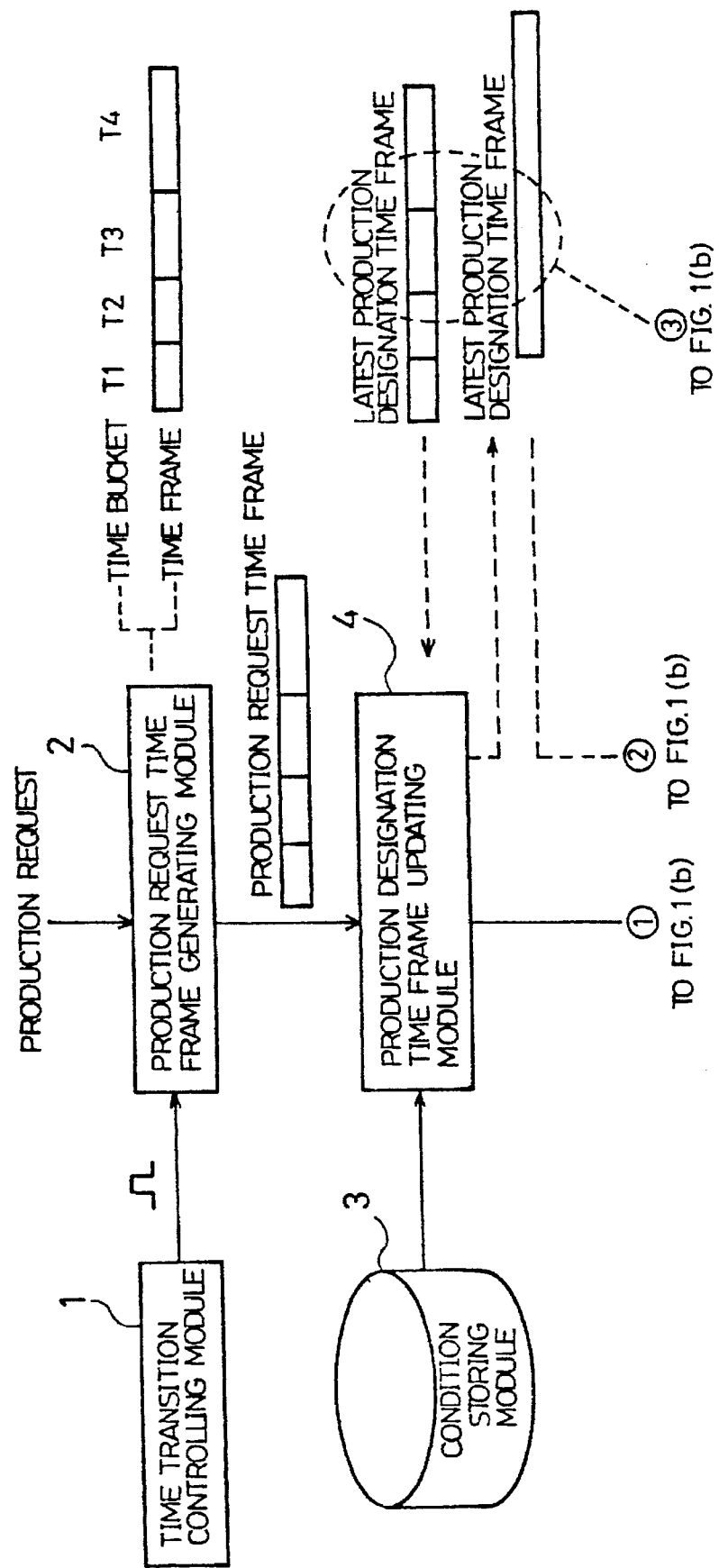

FIG. 3 (a)

| OBJECT TIME BUCKET | | MODIFIED CONDITIONS | |
|---|---|---|---|
| | DEFINITION | $\underline{P_{ij}}$ LOWER LIMIT OF DESIGNATED PRODUCTION QUANTITY FOR TIME BUCKET "i" AND TYPE OF PRODUCT "j" | $\overline{P_{ij}}$ UPPER LIMIT OF DESIGNATED PRODUCTION QUANTITY FOR TIME BUCKET "i" AND TYPE OF PRODUCT "j" |
| T1 | TIME BUCKETS DECIDED LAST TIME | $\underline{P1j} = Q2j$ | $\overline{P1j} = \mathrm{MIN}(Q2j, m_1)$    ($m_1 = 20$) |
| T2 | TIME BUCKETS DECIDED THIS TIME (FINAL DECISION) | $\underline{P2j} = 0$ | $\overline{P2j} = \mathrm{MIN}(\alpha_2 \times Q3j, m_2)$    ($\alpha_2 = 0.6$, $m_2 = 20$) |
| T3 | TIME BUCKETS BEING SUCCESSIVELY DECIDED MEDIUM CERTAINTY | $\underline{P3j} = Q3j - P2j$ | $\overline{P3j} = \mathrm{MIN}(Q3j - P2j + \alpha_3 \times Q4j, m_3)$    ($\alpha_3 = 0.5$, $m_3 = 40$) |

| | TIME BUCKETS BEING SUCCESSIVELY DECIDED (MEDIUM CERTAINTY) | $\underline{P4j} =$ <br> $P3j + Q4j - P3j$ | $\overline{P4j} = \mathrm{MIN}(P3j + Q4j - P3j + \alpha_4 \times Q5j, m_4)$ <br> $(\alpha_4 = 0.4, m_4 = 80)$ |
|---|---|---|---|
| T4 | | | |
| T5 | TIME BUCKETS BEING SUCCESSIVELY DECIDED (SMALL CERTAINTY) | $\underline{P5j} =$ <br> $P4j + Q5j - P4j$ | $\overline{P5j} \leq m_5$ <br> $(m_5 = 160)$ |

$P_{ij}$ IS THE PRODUCTION QUANTITY FOR TIME BUCKET "i" AND TYPE OF PRODUCT "j" OF THE LATEST PRODUCTION DESIGNATION TIME FRAME (AFTER UPDATED).

$Q_{ij}$ IS THE PRODUCTION QUANTITY FOR TIME BUCKET "i" AND TYPE OF PRODUCT "j" OF THE LATEST PRODUCTION DESIGNATION TIME FRAME (BEFORE UPDATED).

"$\alpha_i$" IS A DIVISIBLE COEFFICIENT FOR THE FIRST HALF OF Q1 $(0 \leq \alpha_i \leq 1)$.

"$m_i$" IS THE UPPER LIMIT PRODUCTION QUANTITY OF THE TIME BUCKET "i" DECIDED ACCORDING TO THE PRODUCTION CAPACITY.

"MIN(x, y)" IS THE SMALLEST VALUE BETWEEN x AND y.

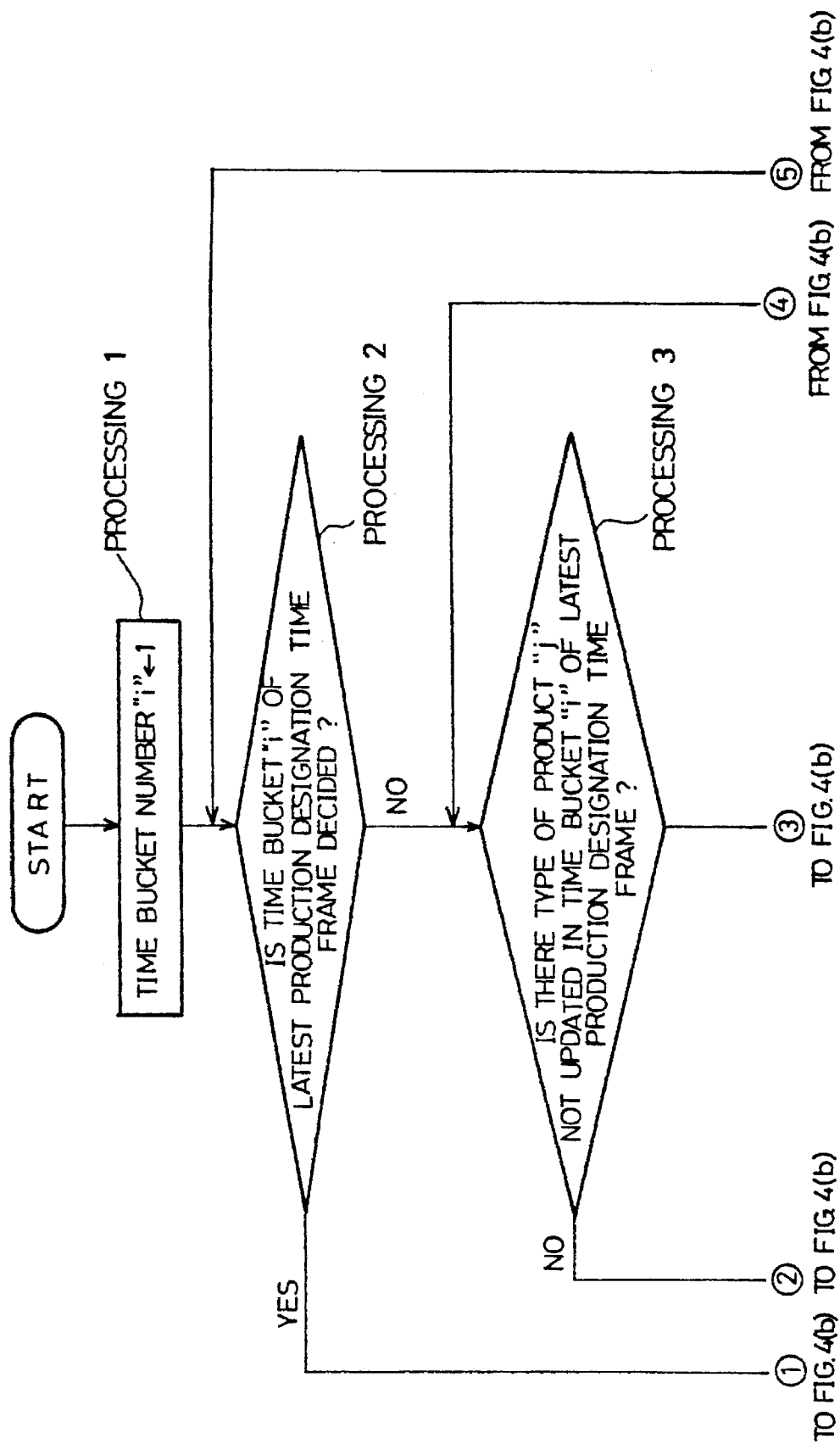

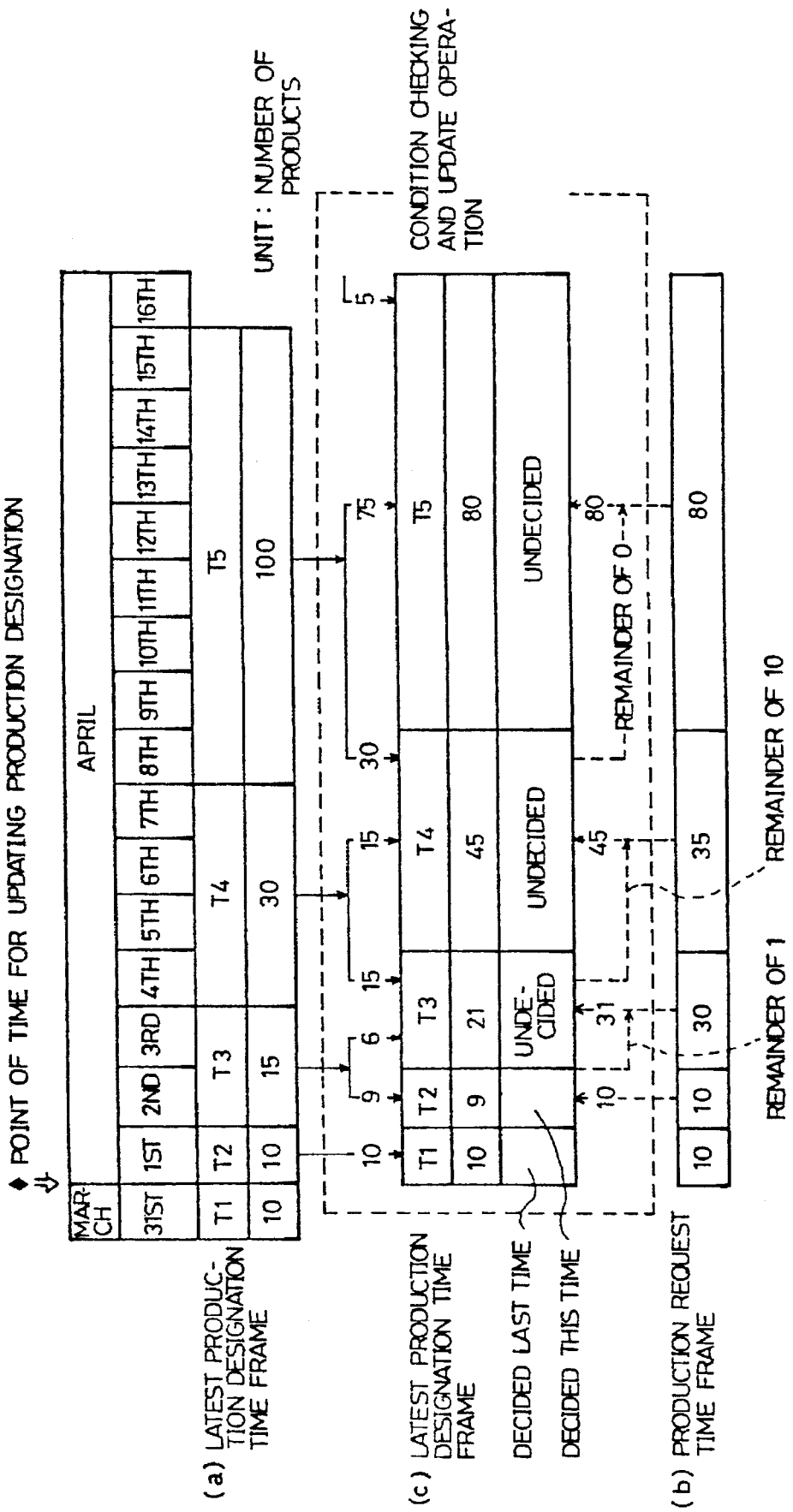

FIG. 6

UNIT : NUMBER OF PRODUCTS

| TIME BUCKET | T1 | T2 | T3 | T4 | T5 |
|---|---|---|---|---|---|
| | 10 | 9 | 21 | 45 | 80 |

- DECIDED AND ARRANGED LAST TIME (T1)
- DECIDED AND ARRANGED THIS TIME (T2, T3)
- PREVIOUSLY NOTIFIED ARRANGEMENT LEVEL 1 (T2, T3)
- PREVIOUSLY NOTIFIED ARRANGEMENT LEVEL 2 (T4)
- PREVIOUSLY NOTIFIED ARRANGEMENT LEVEL 3 (T5)

FIG. 7(a)

| DATE | | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| BEGINNING | PRODUCTION REQUEST AT BEGINNING | 10 | 10 | 10 | 10 | 10 | 10 | 10 | 10 | 10 | 10 | 10 | | | | | | |
| | PRODUCTION REQUEST TIME FRAME | 10 | 10 | 20 | | | 30 | | | 40 | | | | | | | | |
| | PRODUCTION REQUEST FROM FIRST TO SIXTH TIMES | 10 | 10 | 10 | 10 | 15 | 15 | 15 | 20 | 20 | 20 | 20 | 20 | 20 | 20 | 20 | 20 | 20 |
| AT UPDATE | 1ST TIME FRAME | 10 | 10 | 10 | 25 | | | 50 | | | 80 | | | | | | | |
| | 2ND TIME FRAME | | 10 | 10 | 10 | 30 | 30 | 35 | 55 | | | | | | | | | |
| | 3RD TIME FRAME | | | | 10 | 15 | 15 | 15 | 40 | 60 | | 80 | | | | | | |
| | PRODUCTION REQUEST TIME FRAME 4TH TIME FRAME | | | | | 15 | 15 | 15 | 20 | 40 | 60 | | | 80 | | | | |
| | 5TH TIME FRAME | | | | | | 15 | 15 | 20 | 40 | 60 | | | | 80 | | | |
| | 6TH TIME FRAME | | | | | | | | 20 | | 60 | | | | | 80 | | |

UNIT: NUMBER OF PRODUCTS
APRIL

⟨EXAMPLE OF PRODUCTION REQUEST ACCORDING TO DEMAND FORECAST AND RECEIVED ORDER INFORMATION⟩  UNIT: NUMBER OF PRODUCTS

| TYPE OF PRODUCT \ WEEK | APRIL | | | | MAY | |
|---|---|---|---|---|---|---|
| | 1ST WEEK | 2ND WEEK | 3RD WEEK | 4TH WEEK | 1ST WEEK | 2ND WEEK |
| A | 100 | 100 | 100 | 100 | 100 | 100 |
| B | 50 | 50 | 50 | 50 | 50 | 50 |
| C | 100 | 100 | 100 | 100 | 100 | 100 |
| D | 40 | 40 | 40 | 40 | 40 | 40 |
| E | 60 | 60 | 60 | 60 | 60 | 60 |

↓

⟨EXAMPLE OF ALLOCATED PRODUCTION REQUEST TIME FRAME⟩  UNIT: NUMBER OF PRODUCTS

| HIGHER RANK | MEDIUM RANK | LOWER RANK | TYPE OF PRODUCT | 1ST WEEK / T1 / 1 WEEK | 2ND WEEK / T2 / 1 WEEK | 3RD WEEK / T3 / 1 WEEK | 4TH WEEK / T4 / 1 WEEK |
|---|---|---|---|---|---|---|---|
| | a | | A | 100 | 100 | 150 | 350 |
| | | | B | 50 | 50 | | |
| | b | | C | 100 | 100 | 200 | |
| | | | D | 40 | 40 | | |
| | | | E | 60 | 60 | | |

ALLOCATED POSITION OF TIME FRAME TO BE DESIGNATED NEXT TIME →

| T1 | T2 | T3 | T4 |
|---|---|---|---|

| OBJECT TIME BUCKET | | MODIFIED CONDITIONS (TYPE OF PRODUCT DIVIDING CONDITIONS) |
|---|---|---|
| | DEFINITION | |
| T1 | TIME BUCKETS DECIDED LAST TIME | $P1j = Q2j$ |
| T2 | TIME BUCKETS DECIDED THIS TIME (FINAL DECISION) | $P2A = (Y2A/Y2a) *Q3a$ <br> $P2B = (Y2B/Y2a) *Q3a$    WHERE $Y2a = Y2A + Y2B$ <br><br> $P2C = (Y2C/Y2b) *Q3b$ <br> $P2D = (Y2A/Y2b) *Q3b$    WHERE $Y2b = Y2C + Y2D + Y2E$ <br> $P2E = (Y2B/Y2b) *Q3b$ |

| T3 | TIME BUCKETS BEING SUCCESSIVELY DECIDED (LARGE CERTAINTY) | $P3a = (Y3a/Y3@) *Q4$<br>$P3b = (Y3b/Y3@) *Q4$ WHERE $Y3@ = Y3a + Y3b$ |
|---|---|---|
| T4 | TIME BUCKETS BEING SUCCESSIVELY DECIDED (MEDIUM CERTAINTY) | $P4@ = Y4@$ |

Pij IS THE PRODUCTION QUANTITY FOR TIME BUCKET "i" AND TYPE OF PRODUCT "j" OF THE LATEST PRODUCTION DESIGNATION TIME FRAME (AFTER UPDATED).

Qij IS THE PRODUCTION QUANTITY FOR TIME BUCKET "i" AND TYPE OF PRODUCT "j" OF THE LATEST PRODUCTION DESIGNATION TIME FRAME (BEFORE UPDATED).

Yij IS THE QUANTITY FOR TIME BUCKET "i" AND TYPE OF PRODUCT "j" OF THE PRODUCTION REQUEST TIME FRAME.

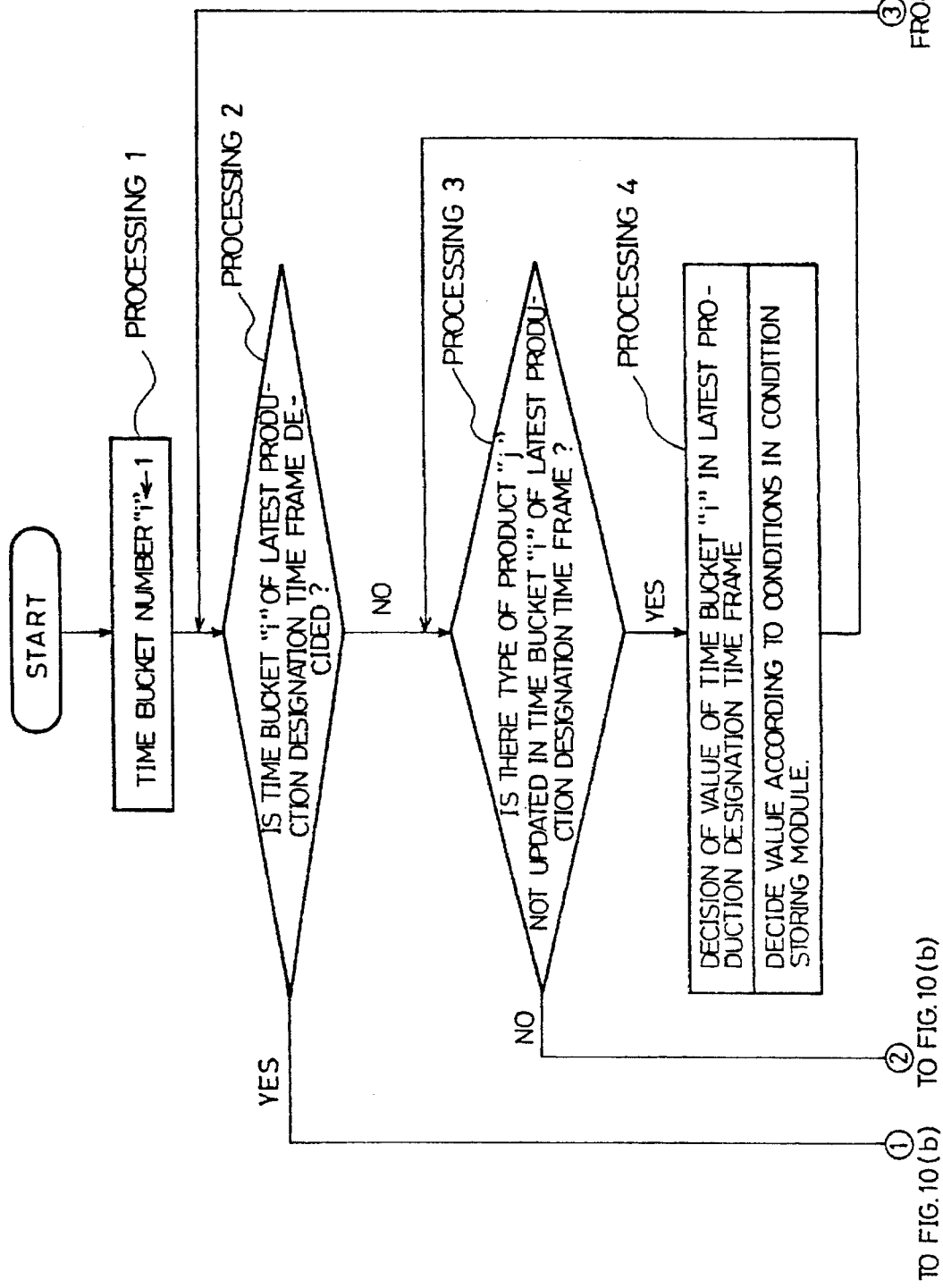

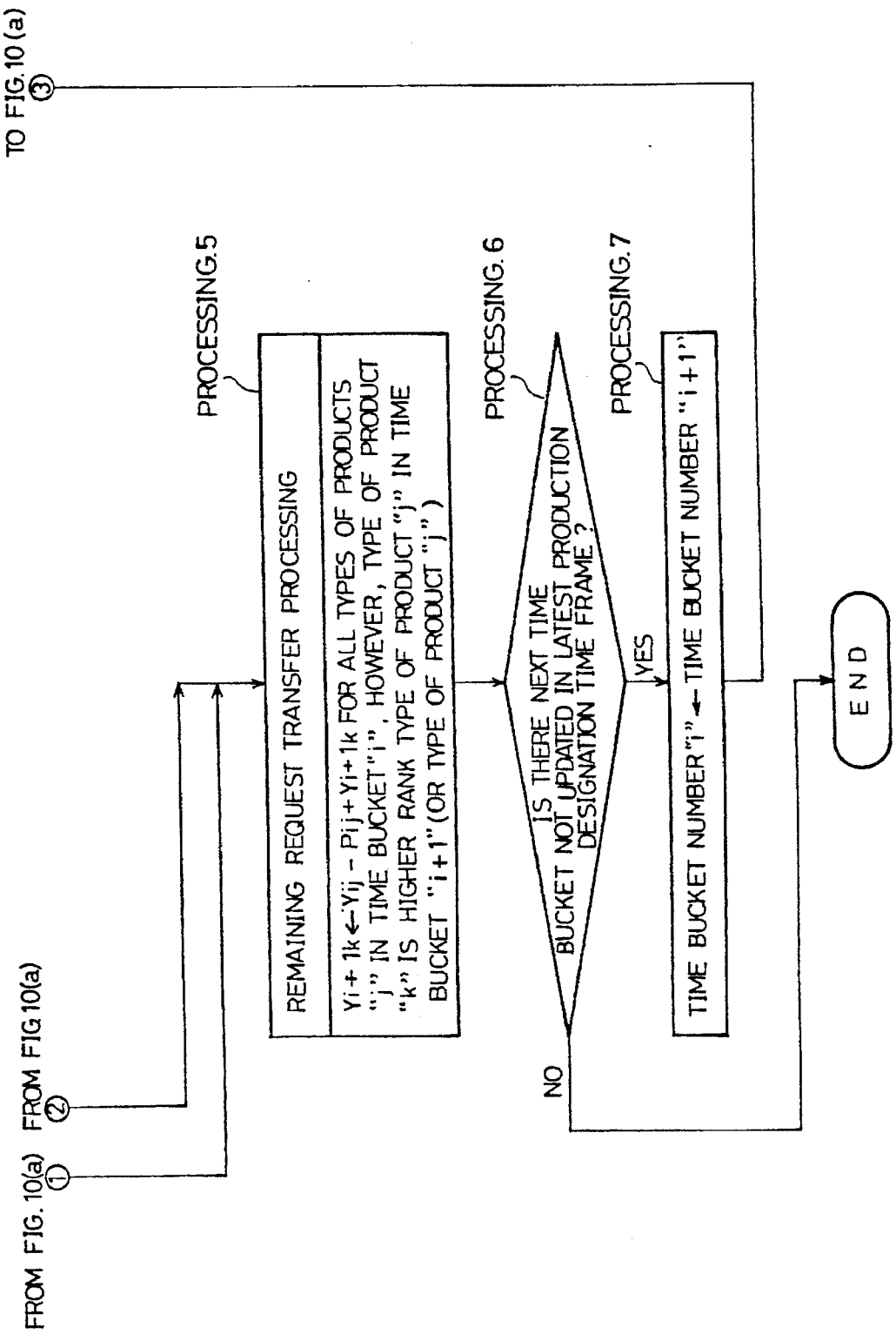

FIG. 11

LATEST PRODUCTION DESIGNATION TIME FRAME

| TYPE OF PRODUCT (HIGHER RANK / MEDIUM RANK / LOWER RANK) | | | MARCH 4TH WEEK T1 1 WEEK | APRIL 1ST WEEK T2 1 WEEK | APRIL 2ND WEEK T3 1 WEEK | APRIL 3RD WEEK T4 1 WEEK |
|---|---|---|---|---|---|---|
| ⓐ | a | A | 100 | 90 | 150 | 350 |
| | | B | 50 | 60 | | |
| | b | C | 100 | 110 | | |
| | | D | 40 | 40 | 100 | |
| | | E | 60 | 60 | | |

PRODUCTION REQUEST TIME FRAME

| TYPE OF PRODUCT (HIGHER RANK / MEDIUM RANK / LOWER RANK) | | | APRIL 1ST WEEK T1 1 WEEK | APRIL 2ND WEEK T2 1 WEEK | APRIL 3RD WEEK T3 1 WEEK | APRIL 4TH WEEK T4 1 WEEK |
|---|---|---|---|---|---|---|
| ⓐ | a | A | 100 | 90 | 150 | 350 |
| | | B | 50 | 60 | | |
| | b | C | 100 | 50 | 200 | |
| | | D | 40 | 20 | | |
| | | E | 60 | 30 | | |

LATEST PRODUCTION DESIGNATION TIME FRAME

| TYPE OF PRODUCT (HIGHER RANK / MEDIUM RANK / LOWER RANK) | | | APRIL 1ST WEEK T1 1 WEEK | APRIL 2ND WEEK T2 1 WEEK | APRIL 3RD WEEK T3 1 WEEK | APRIL 4TH WEEK T4 1 WEEK |
|---|---|---|---|---|---|---|
| ⓐ | a | A | 100 | 90*1 | 150 | 350 |
| | | B | 50 | 60*2 | | |
| | b | C | 100 | 50*3 | 200 | |
| | | D | 40 | 20*4 | | |
| | | E | 60 | 30*5 | | |

DIVIDING OPERATION

⟨LATEST PRODUCTION DESIGNATION TIME FRAME⟩

| TYPE OF PRODUCT (HIGHER RANK / MEDIUM RANK / LOWER RANK) | | | WEEK / TIME BUCKET — APRIL | | | |
|---|---|---|---|---|---|---|
| | | | 1ST WEEK T1 1 WEEK | 2ND WEEK T2 1 WEEK | 3RD WEEK T3 1 WEEK | 4TH WEEK T4 1 WEEK |
| ⓐ | a | A | 1 0 0 | 1 0 0 | 1 5 0 | 3 5 0 |
| | | B | 5 0 | 5 0 | | |
| | b | C | 1 0 0 | 5 0 | 2 0 0 | |
| | | D | 4 0 | 2 0 | | |
| | | E | 6 0 | 3 0 | | |

⟨PART CONSTITUTION INFORMATION⟩

| TYPE OF PRODUCT / PART | PART 0 | PART 1 | PART 2 | PART 3 | PART 4 | PART 5 | PART 6 |
|---|---|---|---|---|---|---|---|
| A | 0 | 0 | 0 | 1 | 0 | 0 | 0 |
| B | 0 | 0 | 0 | 0 | 1 | 0 | 0 |
| C | 0 | 0 | 0 | 0 | 0 | 1 | 0 |
| D | 0 | 0 | 0 | 1 | 0 | 0 | 0 |
| E | 0 | 0 | 0 | 0 | 0 | 0 | 1 |
| a | 0 | 1 | 0 | 1 | 1 | 0 | 0 |
| b | 0 | 0 | 1 | 1 | 0 | 1 | 1 |
| ⓐ | 1 | 0 | 0 | 0 | 0 | 0 | 0 |

PART 0 IS A COMMON PART AT THE LEVEL OF HIGHER RANK TYPE OF PRODUCT.

PARTS 1 AND 2 ARE COMMON PARTS AT THE LEVEL OF MEDIUM RANK TYPE OF PRODUCT.

⟨ PART ARRANGEMENT INFORMATION ⟩

| TIME BUCKET \ PART | PART 0 | PART 1 | PART 2 | PART 3 | PART 4 | PART 5 | PART 6 |
|---|---|---|---|---|---|---|---|
| DECIDED | T4 | T3 | T3 | T2 | T2 | T2 | T2 |
| PREVIOUSLY NOTIFIED | | | | T3 | T3 | T3 | T3 |

FROM FIG.12(a) ①

CALCULATION FOR REQUIRED NUMBER OF PARTS AND GENERATION OF ARRANGEMENT DESIGNATION INFORMATION

*1 : 150*1 = 150
*2 : 100*1 + 20*1 = 120
*3 : 150*1 + 200*1 = 350

⟨ ARRANGEMENT DESIGNATION INFORMATION ⟩

| WEEK | APRIL | | | |
|---|---|---|---|---|
| | 1ST WEEK | 2ND WEEK | 3RD WEEK | 4TH WEEK |
| TIME BUCKET | T1 | T2 | T3 | T4 |
| PART | 1 WEEK | 1 WEEK | 1 WEEK | 1 WEEK |
| PART 0 | | | | 350 |
| PART 1 | | | 150*1 | |
| PART 2 | | | 200 | |
| PART 3 | | 120*2 | 350*3 | |
| PART 4 | | 50 | 150 | |
| PART 5 | | 50 | 150 | |
| PART 6 | | 30 | 200 | |

ARRANGED → (2ND WEEK)
DECIDED DESIGNATION → (3RD WEEK)
PREVIOUSLY NOTIFIED DESIGNATION (UPPER LIMIT VALUE IS DESIGNATED.) → (4TH WEEK)

FIG. 14 PRIOR ART

⟨FORMAT OF EXISTING PRODUCTION PLAN⟩

| PRODUCTION PLAN MADE FOR THE LAST TEN DAYS OF MARCH | APRIL | | | MAY | | | JUNE | | |
|---|---|---|---|---|---|---|---|---|---|
| | FIRST TEN DAYS | MIDDLE TEN DAYS | LAST TEN DAYS | FIRST TEN DAYS | MIDDLE TEN DAYS | LAST TEN DAYS | FIRST TEN DAYS | MIDDLE TEN DAYS | LAST TEN DAYS |
| TYPE OF PRODUCT A | 200 | 200 | 200 | 300 | 300 | 300 | 300 | 300 | 300 |
| TYPE OF PRODUCT B | 300 | 300 | 300 | 300 | 300 | 400 | 400 | 400 | 400 |
| TYPE OF PRODUCT C | 100 | 100 | 100 | 100 | 100 | 100 | 100 | 100 | 100 |
| TYPE OF PRODUCT D | 0 | 0 | 0 | 0 | 0 | 0 | 0 | 0 | 100 |
| TOTAL | 600 | 600 | 600 | 700 | 700 | 800 | 800 | 800 | 900 |
| MONTHLY TOTAL | 1800 | | | 2200 | | | 2500 | | |

EXAMPLE OF PREPARATION FOR PRODUCTION IN JUNE (TWO MONTHS AHEAD) ACCORDING TO THE PLAN MADE IN THE LAST TEN DAYS OF MARCH

PRODUCTION PREPARATION ①
(ARRANGEMENT OF PARTS)
A TOTAL OF 2,500 COMMON PARTS FOR TYPES OF PRODUCTS A TO D FOR JUNE ARE ORDERED.

PRODUCTION PREPARATION ②
(MAKING OF LINE WORKING PLAN AND SECURING OF PRODUCTION CAPACITY)
BECAUSE A TOTAL OF 2,500 COMMON PARTS FOR JUNE CANNOT BE PRODUCED BY THE PRESENT NUMBER OF MEMBERS, THREE PART TIMERS ARE RECRUITED.

PRODUCTION PREPARATION ③
(REQUEST OF PRODUCTION TO THE AFFILIATED FACTORY)
BECAUSE THE TYPE OF PRODUCT D HAS OPTIONAL SPECIFICATION, AN ORDER FOR 100 COMMON PARTS IS GIVEN TO THE AFFILIATED FACTORY SO THAT THEY ARE DELIVERED BY THE LAST TEN DAYS OF JUNE.

FIG.15(a) PRIOR ART

FLOW OF PRODUCTION PLAN MAKING
FOR THE FIRST TEN DAYS OF APRIL

⟨PROCCESSING ACCORDING TO EXISTING PRODUCTION PLAN⟩

PROCESSING 1: PREPARATION FOR ROUGH PLAN
ROUGH PRODUCTION PLAN IS MADE ACCORDING TO DEMAND FORECAST AND RECEIVED ORDER INFORMATION.

↓

|  | APRIL | | MAY | | | JUNE | | | JULY | PRODUCTION PLAN MODIFICATION |
|---|---|---|---|---|---|---|---|---|---|---|
|  | MIDDLE TEN DAYS | LAST TEN DAYS | FIRST TEN DAYS | MIDDLE TEN DAYS | LAST TEN DAYS | FIRST TEN DAYS | MIDDLE TEN DAYS | LAST TEN DAYS | FIRST TEN DAYS | |
| TYPE OF PRODUCT A | 200 | 200 | 300 | 300 | 300 | *200 | *400 | 300 | 300 | |
| TYPE OF PRODUCT B | 300 | 300 | 300 | 300 | 400 | *500 | *300 | 400 | 400 | |
| TYPE OF PRODUCT C | 100 | 100 | 100 | 100 | 100 |  | 100 | 100 | 100 | |
| TYPE OF PRODUCT D | 0 | 0 | 0 | 0 | 0 | *100 | 0 | *0 | 0 | |
| TOTAL | 600 | 600 | 700 | 700 | 800 | 800 | 800 | 800 | 800 | |
| MONTHLY TOTAL | 1200 | | 2200 | | | 2400 | | | 800 | |

THE SIGH "*" REPRESENTS A VALUE OBTAINED BY MODIFYING THE PLANNED VALUE LAST TIME.

① TO FIG.15(b)

② FROM FIG.15(b)

FIG.15(b) PRIOR ART

FROM FIG.15(a) ① → PROCESSING 2 : CHECKING 1 FOR DEGREE OF MODIFYING THE PLAN WHICH IS MADE LAST TIME (CHECKING THE NUMBER OF PRODUCTS)
CAPACITY CHECKING: WHETHER THE TOTAL PRODUCTION QUANTITY FOR JUNE CAN BE COVERED BY THE PRODUCTION CAPACITY SHOWN IN THE WORKING PLAN WHICH IS ALREADY MADE. (CORRESPONDING TO THE LATEST PRODUCTION PREPARATION ②)
SUBCONTRACTED TYPE OF PRODUCT DELIVERY DEADLINE CHECKING: WHETHER THE REQUESTED DELIVERY DEADLINE OF TYPE OF PRODUCT D IS ADVANCED TEN DAYS OR MORE. (CORRESPONDING TO THE LATEST PRODUCTION PREPARATION ③)

→ THE CHECKING RESULT IS NG. → TO FIG.15(a) ②

↓

PROCESSING 3 : REQUIRED MATERIAL QUANTITY CALCULATION (CALCULATION WITH COMPUTER)

↓

PROCESSING 4 : CHECKING 2 FOR DEGREE OF MODIFYING THE PLAN WHICH IS MADE LAST TIME (CHECKING THE NUMBER OF PARTS)
PARTS ARRANGEMENT CHECKING: WHETHER THE NUMBER OF COMMON PARTS ALREADY ARRANGED IS EXCEEDED. (CORRESPONDING TO THE LATEST PRODUCTION PREPARATION ①)

→ THE CHECKING RESULT IS NG. → TO FIG.15(a) ②

↓ THE CHECKING RESULT IS OK.

ARRANGEMENT OF NECESSARY PARTS ACCORDING TO PRODUCTION PLAN

SUCCESSIVELY-DECIDING PRODUCTION PLANNING SYSTEM

BACKGROUND OF THE INVENTION

1. Field of the Invention

The present invention relates to a successively-deciding production planning system for efficiently planning the production of products, the required number of parts, and the material arrangement according to the required number of parts and required period.

2. Description of the Related Art

It is the function of a production plan to determine three factors of the type of product to be produced, the quantity, and the period by reflecting product orders and demand forecast. However, the production plan is frequently modified due to the fluctuation of product orders and demand forecast values. Because production preparation including parts arrangement requires some preceding lead time for the point of time for actual production, it is necessary to make a plan in view of a relatively long time from the present to the future by considering the preceding lead time. For sales forecast data such as product orders and demand forecast, however, further information has more indeterminate factors. Therefore, the production plan should be reviewed according to the elapse of time.

The existing production planning system generally uses a method for allocating a production quantity to a time schedule representing a production period equally divided at a certain interval. For this method, however, the production quantity per day for the near future (e.g. 2 days ahead) is greatly different from that for the far future (e.g. one month ahead) in the actual certainty. A product generally belongs to a family formed by collecting similar products in view of the structure and several families are further collected for assortment of products as the entire product group including many ranks of products from lower to higher ranks. For example, higher-rank type of product is a group of plurality of lower-rank types of product. And, in the other example, a higher-rank type of product is a standard type of product and a lower-rank type of product is a variation of the higher-rank type of product. For sales forecast data, further information has higher accuracy for the level of higher-rank type of product but lower accuracy for the level of lower-rank type of product. However, a production plan is frequently made for the level of the lowest-rank type of product. Moreover, a type of product for the near future is greatly different from that for the far future in the certainty. Therefore, for the existing production planning system, production quantity and type of product are equally handled as pieces of designation information having no difference in the accuracy in a time schedule representing the production period.

For the existing production planning system, as described above, planned production values (e.g. type of product to be produced and quantity) with lower certainty further allocated are frequently modified. In this case, it is difficult to keep the overall consistency by correcting only the value to be modified. Therefore, a production plan may be modified to an inexecutable plan in view of the lead time for part arrangement or to a plan having large loss as a whole. To avoid this error, a method is used to make an executable and optimum production-plan modification plan by repeatedly performing the calculation for the required material quantity plan based on a production-plan modification plan and previous evaluation of the plan. However, the calculation for the required material quantity plan becomes a bottle neck because it requires a very long time. Therefore, the production plan is frequently modified before it is adequately evaluated. According to the above plan modification, required number of parts and materials are planned and these planned values are sent to the production lines, users, and suppliers of the company concerned as modification designation information. Oversupply of the modification information including the above problems causes disorder of production lines, delay of delivery deadline, and decrease of productivity.

The problems of the existing production planning system are described below in detail by referring to FIGS. 14 and 15. FIG. 14 shows an existing production plan. This plan is made in the last ten days of March, in which the production quantity for three months from April to June is planned for each ten days of a month and each type of product. The plan for April close to the point of time the plan is made and the plan for June which is the near future are expressed as data of the same format with no difference in accuracy. When a production plan is made, production preparation securing a proper lead time must be performed (e.g. arrangement of parts, securing of production capacity, and subcontract). For the plan for June in FIG. 14, it is necessary to execute the production preparation duties including a two-month lead time. Preparation duties for June production to be executed according to this production plan are described at the right of FIG. 14. For example, when a part requiring the delivery period of two months is arranged by using the planned values for June (production preparation <1>). Moreover, if a two-month lead time is also necessary to secure the production capacity, a line working plan for June is made and actions for securing a necessary production capacity must be taken (production preparation <2>). Further more, it is necessary to order products from an external affiliated factory (production preparation <3>).

FIG. 15 shows the details of production planning a ten-day period after the period in FIG. 14. In this case, a plan for three months from the middle ten days of April to the first ten days of July is made. First, a rough production plan is made according to demand forecast and received order information (Processing 1). Then, this plan is compared with the plan made last time to check if a large modification is made (Processing 2). Especially, the contents of the production preparation in the latest plan or the processing in the last ten days of March cannot be greatly modified. Therefore, it is necessary to check the modification degree. For example, checking with the production capacity of the working plan made last time and checking of the delivery period of the subcontracted type of product are necessary. The above mentioned is the checking of product quantity. However, it is necessary to check the quantity level of parts necessary for products. Summing the number of parts necessary for each type of product is called the required material quantity calculation which is normally performed by a computer because the operation requires a large calculation load.

After the required quantity of each type of part is calculated, the modification degree is checked at the part quantity level with the latest production plan (Processing 4). For example, it is necessary to check if the number of parts already ordered is exceeded. If a trouble occurs in the product quantity level checking (Processing 2) or part quantity level checking (Processing 4), the production plan is corrected and the same processing is repeated once again. For example, because the delivery deadline of 100 parts of the type of product D in FIG. 15 is 2 ten-day periods earlier than that in FIG. 14, it becomes NG in the subcontracted type-of-product delivery deadline checking of Processing 2. Though this example is described by using simple values, actually necessary checking is complex. In the number-of-part checking, for example, it is necessary to check not only the period quantity (quantity for June) but the cumulative quantity (cumulative quantity from April to June). The existing production planning system described above has the following problems.

Problem 1: Further production plan is extremely minute and the number of data values is too many. That is, as shown in FIG. 14, the production preparation using the further production plan includes a line working plan (capacity plan) and part ordering, which frequently uses macro information such as monthly total and total of type-of-product groups compared with the very near plan. For example, the production preparations <1> and <2> in FIG. 14 are performed by using the total value in June. This is because the accuracy of macro information is higher than that of detailed information though detailed production plan information is frequently modified later even if it is used. However, all existing production plans require a large amount of data because they are expressed with micro information.

Problem 2: It takes a lot of time to check the possibility for modification of a production plan. That is, because calculations except the development of the required number of parts (Processing 3) in FIG. 15 are performed by hand, it takes a lot of time. Even the calculation of the required number of parts requires a lot of time because the actual number of types of products amounts to hundreds to thousands and the actual number of types of parts amounts to thousands to hundreds of thousands.

Problem 3: A production plan is modified before it is adequately checked. That is, the time for production planning is greatly shortened because the request for short delivery period has been increased in recent years. For example, when collection of received order information necessary for production planning and arrangement and calculation of materials based on production plan information are performed according to a predetermined time schedule, a production plan must be made during the period. Moreover, it takes a lot of time to develop the required number of parts as previously mentioned. For example, if three days are allowed for production planning and parts development can be performed by a computer only once in the nighttime, checking up to the part level can be performed only two to three times. Therefore, the production plan is forwarded before it is adequately checked. According to the plan modification, the required number of parts and material arrangement are planned and transferred to the production lines, suppliers, and subcontractors of the company concerned as modification designation information. Oversupply of the modification information including the above problems causes disorder of production lines, delay of delivery deadline, and decrease of productivity.

Problem 4: A production plan cannot be made which adequately reflects demand forecast and received order information. That is, as described in Problem 3, a production plan not adequately reviewed is made, causing troubles such as delay of delivery to users.

Problem 5: The criteria for modification checking is not clear. That is, because the modification checking criteria shown in FIG. 15 lies in the brain of the person in charge of production planning, it is impossible to quantitatively obtain the modification possibility from a shown production plan. In general, the modification degree is experientially estimated in an affiliated factory or parts machining line. Though the modification degree can be previously determined as an operation rule, it is difficult to completely observe the rule unless there is sufficient time for production plan modification checking. The present invention is made to solve the above problems and an object is to provide a successively-deciding production planning system capable of preventing disorder of production lines due to oversupply of improper modification designation information caused by production plan modification, realizing efficient calculations (required material quantity plan, material arrangement plan, and arrangement information designation) with a computer, and solving the above five problems.

SUMMARY OF THE INVENTION

The successively-deciding production planning system related to the present invention, as shown in FIG. 1, comprises time transition controlling means (time transition controlling module 1) for controlling production plan updating time and commanding the point of time to decide a production plan; production request time frame generating means (production request time frame generating module 2) to be activated by a command given from the time transition controlling means to allocate data for the required production quantity of each type of product to a series of time buckets from T1 to Tn representing a period for producing products in accordance with product request input; condition storing means (condition storing module 3) for describing modifiable conditions on the production quantity of each type of product; production designation time frame updating means (production designation time frame updating module 4) for receiving the production request time frame generated by the production request time frame generating means before collating the received time frame with the production designation time frame representing the latest production designation and with the description contents in the condition storing means and performing operations for dividing and recombining time buckets to fluctuate the production quantity stored in undecided time buckets in order to generate the latest production designation time frame representing the next production designation including the decided production designation; part constitution information storing means (part constitution information storing module 5) for describing the subordination between part groups constituting a product; required material quantity calculating means (required material quantity calculating module 6) for receiving the production designation time frame from the production designation time frame updating means and collating the received time frame with the part constitution information storing means to compute the number of component parts necessary for actual production arrangement; part arrangement information storing means (part arrangement information storing module 7) for describing information including the lead time for purchasing parts; and arrangement designation information generating means (arrangement designation information generating module 8) for generating the information for the required number of component parts developed the designation information to be given to outside as decided or previously-notified information through the part arrangement information storing means.

For the successively-deciding production planning system of another mode of the present invention, as shown in FIG. 8, a higher-rank type of product to be produced and conditions for dividing the quantity of the higher-rank type of product into the quantity of each lower-rank type of product to be produced are described in the condition storing means in a production plan including a plurality of similar types of products to be produced and the production designation time frame updating means receives a production request time frame from the production request time frame generating means before collating the received time frame with the production designation time frame representing the latest production designation and with the description contents in the condition storing means and performing the type-of-product dividing operation for dividing the higher-rank type of product to be produced stored in an undecided time bucket and the quantity of the higher-rank type of product to be produced into the quantity of each lower-rank type of product to be produced in order to generate a latest production designation time frame representing the next production designation including the decided production designation.

For the successively-deciding production planning system of still another mode of the present invention, as shown in FIG. 13, a higher-rank type of product to be produced, conditions for dividing the quantity of the higher-rank type of product into the quantity of each lower-rank type of product to be produced, and conditions capable of changing a production quantity are described in the condition storing means in a production plan including a plurality of similar types of products to be produced and the production designation time frame updating means receives a production request time frame from the production request time frame generating means before collating the received time frame with the production designation time frame representing the latest production designation and with the description contents in the condition storing means, performing the type-of-product dividing operation for dividing the higher-rank type of product to be produced stored in an undecided time bucket and the quantity of the type of product into the quantity of each lower-rank type of product to be produced, performing the operations for dividing and recombining the time buckets to fluctuate the quantity of the type of product to be produced in order to generate a latest production designation time frame representing the next production designation including the decided production designation.

The successively-deciding production planning system of the present invention divides a time schedule representing a production period so that further portion with lower certainty has longer time interval to allocate production quantity. That is, the system has a time frame comprising time buckets having the relationship of "|T1|≤|T2|≤ ... ≤|Tn−1|≤|Tn|". Moreover to approximate the latest production request, the system takes in fluctuant production requests in accordance with elapse of time and updates production designation. In this case, the system allocates the designated quantity of each old production designation time bucket to each of a series of new production designation time buckets divided and recombined under the conditions specifying the designation modifiable range by using the discrepancy between new and old time frames due to the difference between the points of time for production designation. This operation is referred to as "time bucket dividing and recombining operation" in the first invention. This makes it possible to prepare an executable production designation with consistency as a whole can be prepared without production execution possibility checking and correspond to production request fluctuation without disorder of production by giving production arrangement designation information showing the certainty such as previous notice or decision based on the conditions specifying the modifiable range to production lines.

Though the successively-deciding production planning system of another mode of the present invention has a time frame comprising time buckets having the relationship of "|T1|=|T2|= ... =|Tn−1|=|Tn|", the system expresses further-allocated time bucket with lower certainty as the quantity of each higher-rank type of product which is a group of a plurality of lower-rank types of products and designates production. Moreover, the system takes in fluctuant production requests according to elapse of time and updates production designation. In this case, to come close to the latest production request, the system divides the quantity of each higher-rank type of product into the quantity of each lower-rank type of product under the conditions specifying the condition for dividing into the quantity of each lower-rank type of product and allocates the quantity to each new production designation time bucket. This operation is referred to as "type-of-product dividing operation" in the second invention. This makes it possible to prepare an executable production designation without production execution possibility checking and correspond to production request fluctuation without disorder of production by giving production arrangement designation information showing the certainty such as previous notice or decision based on the conditions specifying the condition for dividing into the quantity of each lower-rank type of product to production lines.

The successively-deciding production planning system of still another mode of the present invention has a time frame comprising buckets having the relationship of "|T1|≤|T2|≤ ... ≤|Tn−1|≤|Tn|" so that a further portion of a time schedule representing a production period with lower certainty has longer time interval, allocates production quantity to each time bucket, expresses a further-allocated time bucket with a low certainty as the quantity of each higher-rank type of product which is a group of a plurality of lower-rank types of products, and designates production. Moreover, the system takes in fluctuant production requests according to elapse of time and updates production designation. In this case, the system updates production designation by combining the "time bucket dividing and recombining operation" with the "type-of-product dividing operation". That is, to come close to the latest production request, the system divides and recombines the designated quantity of each old production designation time bucket under the conditions specifying the condition for dividing into the quantity of each lower-rank type of product by using the discrepancy between new and old time frames due to the difference between the points of time for production designation, divides the quantity of each higher-rank type of product into the quantity of each lower-rank type of product under the conditions specifying the condition for dividing into the quantity of each lower-rank type of product, and allocates the quantity to each new production designation time bucket. This makes it possible to prepare an executable production designation without production execution possibility checking and correspond to the production request fluctuation without disorder of production because production arrangement designation information showing the certainty such as previous notice or decision based on the conditions specifying the condition for dividing into the quantity of each lower-rank type of product according to the conditions specifying the modifiable range and advance of time bucket number is given to production lines. The above and other objects, features, and advantages of the invention will become more apparent from the following description when taken in conjunction with the accompanying drawings.

BRIEF DESCRIPTION OF THE DRAWINGS

FIGS. 1(a) and 1(b) are a functional block diagrams of the successively-deciding production planning system according to Embodiment 1;

FIGS. 3(a) and 3(b) are diagrams showing the contents of the condition storing module of Embodiment 1;

FIGS. 4(a)–(c) are flow chart showing the operation algorithm of the production designation time frame updating module of Embodiment 1;

FIG. 5 is a diagram showing an operation of the production designation time frame updating module of Embodiment 1 following the conditions in FIG. 3 and the operation algorithm in FIG. 4;

FIG. 6 is a diagram showing the arrangement designation information generating module showing system of Embodiment 1;

FIG. 8 is a diagram showing an operation of the production request time frame generating module of Embodiment 2;

FIGS. 9(a) and 9(b) are diagrams showing the conditions in the condition storing module of Embodiment 2;

FIGS. 10(a) and 10(b) are diagrams showing the operation algorithm of the production designation time frame updating module of Embodiment 2;

FIG. 11 is a diagram showing an operation of the production designation time frame updating module of Embodiment 2 following the conditions in FIGS. 9(a) and 9(b) and the operation algorithm in FIG. 10;

FIGS. 12(a) and 12(b) are a diagrams showing part constitution information and part arrangement information of Embodiment 2 and operations of the required material quantity calculating module and arrangement information generating module according to the information;

FIG. 14 is a diagram showing an exiting production plan; and

FIGS. 15(a) and 15(b) are a diagrams showing the production planning details one ten-day period after the period in FIG. 14.

DESCRIPTION OF THE PREFERRED EMBODIMENTS

Figure 1B:
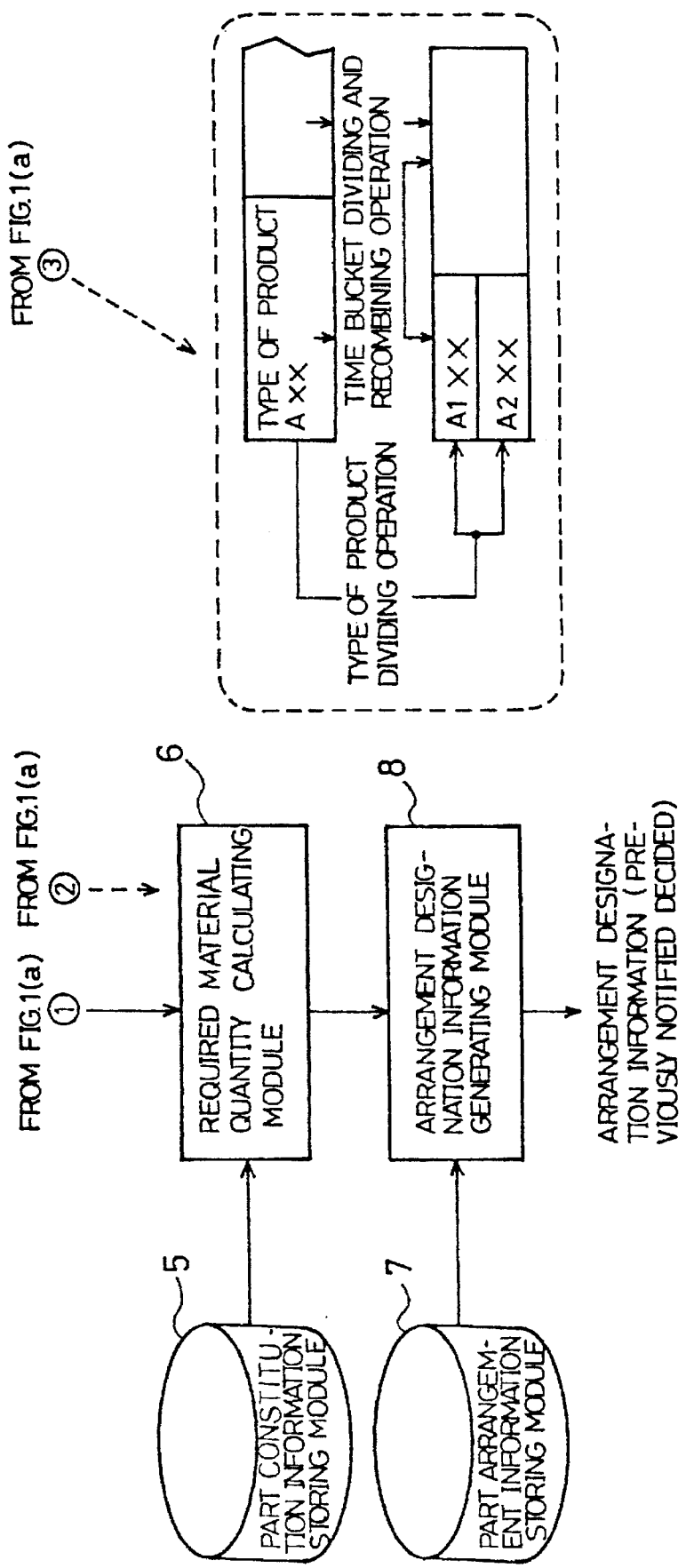

An embodiment of the present invention is described below in detail by referring to drawings. FIG. 1 is a functional block diagram of the successively-deciding production planning system according to an embodiment (Embodiment 1) of the present invention. In FIGS. 1(a) and 1(b), symbol 1 is a time transition controlling module serving as time transition controlling means for controlling the production plan updating time. Symbol 2 is a production request time frame generating module serving as production request time frame generating means for allocating the required production quantity of each type of product to a series of time buckets representing the product producing period according to production requests. Symbol 3 is a condition storing module serving as condition storing means for describing modifiable conditions on the production quantity of each type of product. Symbol 4 is a production designation time frame updating module serving as production designation time frame updating means for collating the production quantity of each type of product with the production request information which is an output of the production request time frame generating module 2 and with the description contents in the condition storing module 3, performing the operation for updating the quantity of each type of product, and shifting the updated data to a time frame representing the next production designation including the decided production designation. Symbol 5 is a part constitution information storing module serving as part constitution information storing means for describing the subordination between part groups constituting a product. Symbol 6 is a required material quantity calculating module serving as required material quantity calculating means for receiving the latest production designation time frame, collating the received time frame with the contents in the part constitution information storing module 5, and computing the required quantity of component parts necessary for actual production arrangement. Symbol 7 is a part arrangement information storing module serving as part arrangement information storing means for describing information including the lead time for purchasing parts. Symbol 8 is an arrangement designation information generating module serving as arrangement designation information generating means for generating part designation information to be given to outside as decided or previously-notified information by collating the information with the required quantity of component parts which is an output of the required material quantity calculating module 6 and with the description contents in the part arrangement information storing module 7.

The production request time frame generating module 2 is activated by the time transition controlling module 1 for commanding the point of time for deciding the production plan of a product, which uses production requests as inputs, allocates data for the required production quantity of each type of product to each of a series of time buckets from T1 to Tn representing a production period of products, and generates a production request time frame. The production designation information updating module 4, when the production request time frame is inputted, compares the required production quantity of each time bucket of the production request time frame with the upper- and lower-limit conditions of each time bucket shown by the condition storing module 3 in order of bucket number starting with the smallest one except decided bucket numbers, obtains the production designation quantity in the range, and perform the "time bucket dividing and recombining operation" for allocating the quantity to the time buckets of the production designation time frame representing production designation. If the required production quantity is different from the designated production quantity, the difference is added to the required production quantity of the next-number time bucket as a request remainder. This procedure is performed on a series of time buckets to update the production designation time frame. In this case, a time bucket next to the time bucket decided last time is the time bucket to be decided this time. A time bucket is defined as a unit element obtained by dividing the production period in a production plan in time series, which represents a time length and to which production quantity and type of product is allocated as internal data. A time frame is defined as a group of a series of time buckets, which shows a time schedule for production at a point of time.

The upper- and lower-limit conditions of the production quantity to be covered by each time bucket of the next production designation time frame are described in the condition storing module 3, which are determined according to the production quantity dividing conditions and the production quantity of each bucket of the latest production designation time frame by considering the relationship between new and old time buckets to be shifted due to the discrepancy between new and old time frames when the production designation time frame is updated and the capacity of the production line of each time bucket of the time frame. A bucket having the equal upper- and lower-limit values specified by the both conditions represents that it is already decided and the next-number time bucket represents a time bucket to be decided next. Larger difference between upper- and lower-limit values represents lower certainty. That is, an earlier time bucket or a larger-number time bucket has a lower certainty. The required material quantity calculating module 6 receives a production designation time frame from the production designation time frame updating module 4 before collating the received time frame with the contents in the part constitution storing module 5 for describing the subordination between part groups constituting a product and computing the required quantity of component parts necessary for actual production arrangement. The arrangement designation information generation module 8 generates designation information to be given to outside as decided or previously-notified information by using the contents in the part arrangement information storing module 7 in which the information including the lead time for purchasing parts is described and the required quantity of the developed component parts.

Figure 2:
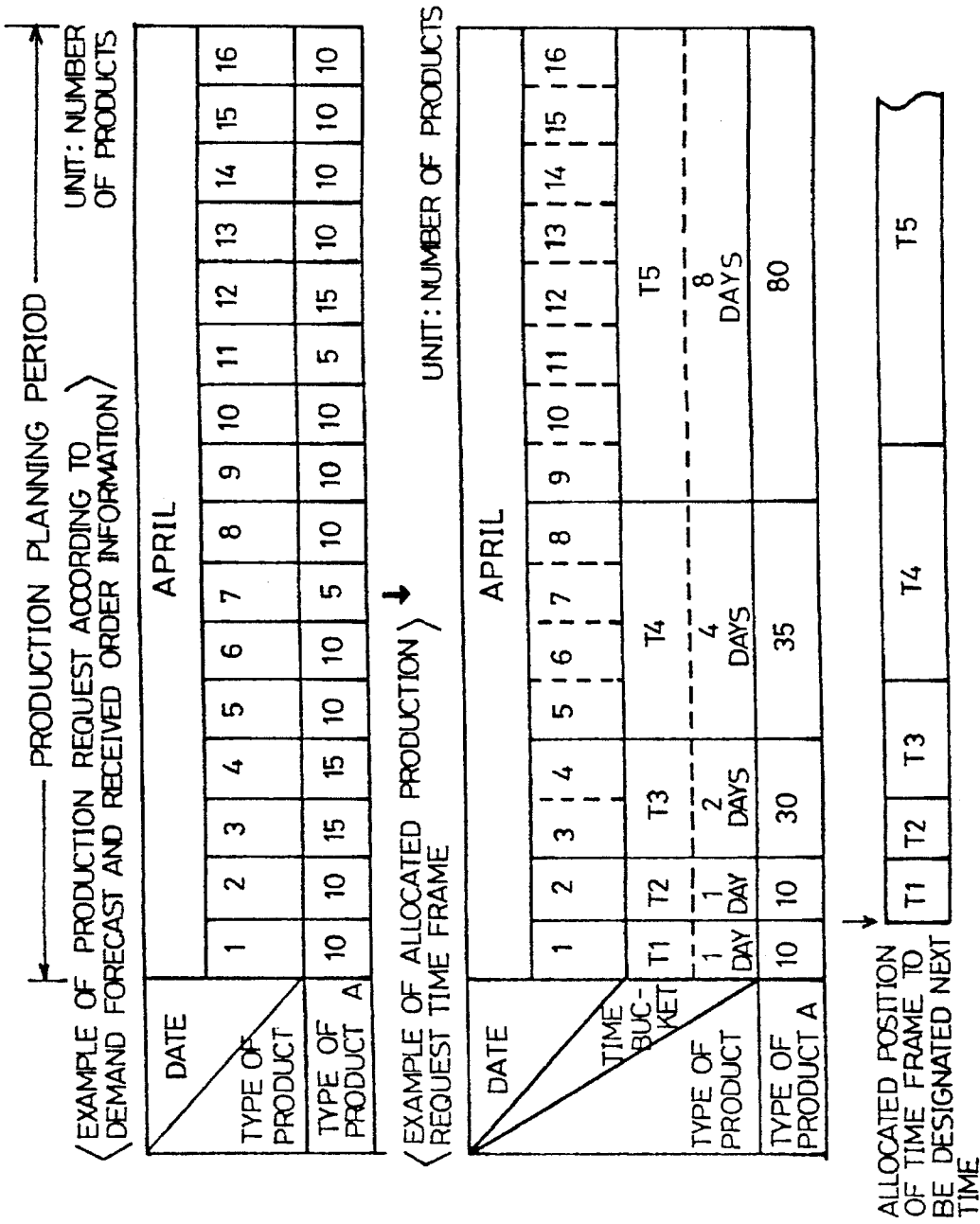
FIG. 2 is a diagram showing an operation of the production request time frame generating module of Embodiment 1.

FIG. 2 shows production request data and a production request time frame allocated by the production request time frame generating module 2 by using the production request data as an input. For this example, lengths of time buckets from T1 to T5 are expressed as "|T1|=|T2|=1 day<|T3|=2 days≦|T4|=4 days≦|T5|=8 days". Thus, a further area having a lower certainty of production plan value has a larger value. The production request time frame generating module 2 summarizes production requests given from outside as the data for numerical values required for each production period and each type of product every time bucket, allocates the required quantity for each type of product to each time bucket, and generates a production request time frame. For this example, a production request time frame is generated every day. However, allocation is always executed for the latest production request at the point of time and performed at the position deviated by one day as shown at the bottom of FIG. 2.

FIGS. 3(a) and 3(b) show conditions for the condition storing module. In this case, the upper- and lower-limit conditions to be covered by each new time bucket are given by considering the production quantity stored in each time bucket in the latest production designation time frame and the divisible and production-capacity conditions when the time frame is shifted. At the same time, the time bucket certainty is specified by these conditions. That is, for this example, the time bucket T1 has equal upper- and lower-limit values to meet the production capacity. This represents that the time bucket T1 is decided last time and the next T2 is an object to be decided this time.

Figure 4B:
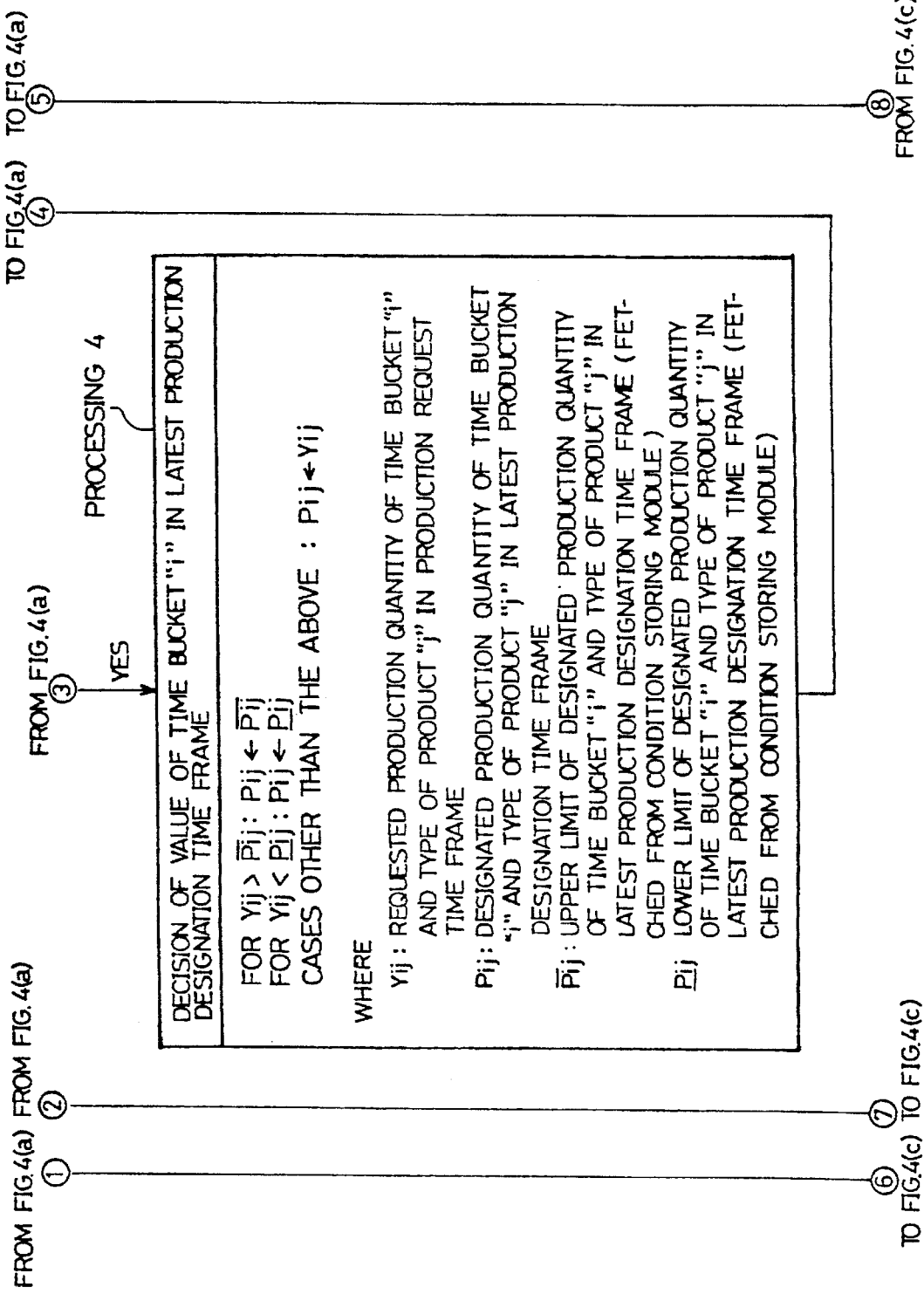
Figure 4C:
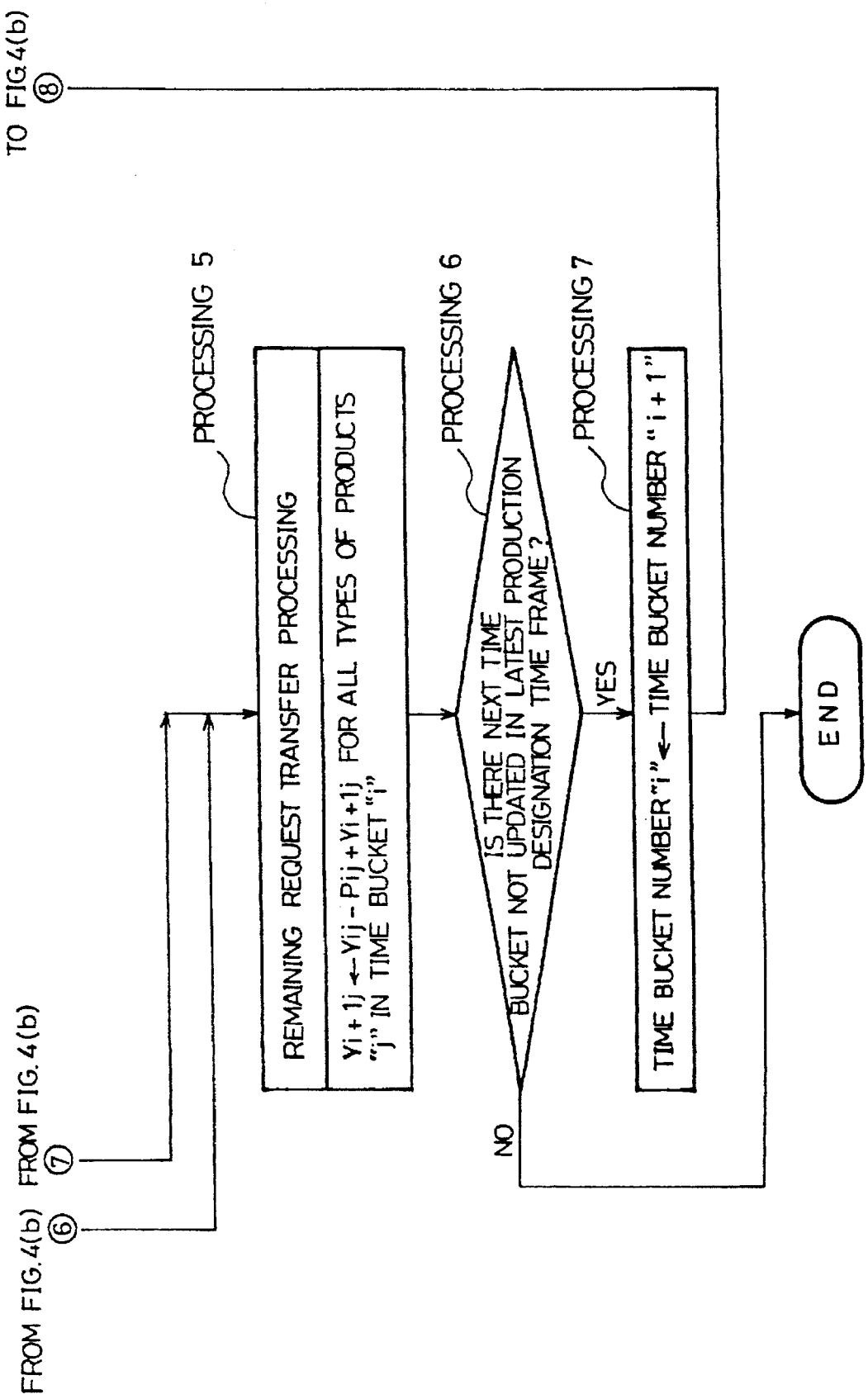

FIGS. 4(a), 4(b) and 4(c) show an operation algorithm of the production designation time frame updating module. In the time frame in FIG. 14, the updating operation is performed by collating time buckets with the contents in the condition storing module in order of time bucket number starting with the smallest one. The difference between the required production quantity and the designated production quantity is transferred as a request remainder or, if the next-number time bucket is present, transferred as the required production quantity for the time bucket (see Processings 1 to 7).

FIG. 5 shows an operation of the production designation time frame updating module according to the conditions in FIGS. 3(a) and 3(b) and the operation algorithm in FIGS. 4(a), 4(b) and 4(c), in which (c) the latest production designation time frame is generated according to (a) the latest production designation time frame and (b) the production request time frame before the required material quantity is calculated according to the latest production designation time frame and part constitution information and arrangement designation information is generated according to the part arrangement information. FIG. 6 shows an arrangement information showing system. Designation information is designated according to the certainty of each of the time buckets from T1 to T5. Actually, it is possible to use a method for showing an undecided previously-notified arrangement portion with upper- and lower-limit values according to the certainty level or for showing it with an expected value or average value. It is also possible to show a delivery deadline with the earliest time, latest time, and medium time of time bucket. In any case, it is possible to provide effective information as the previously-notified information for production preparation.

Figure 7:
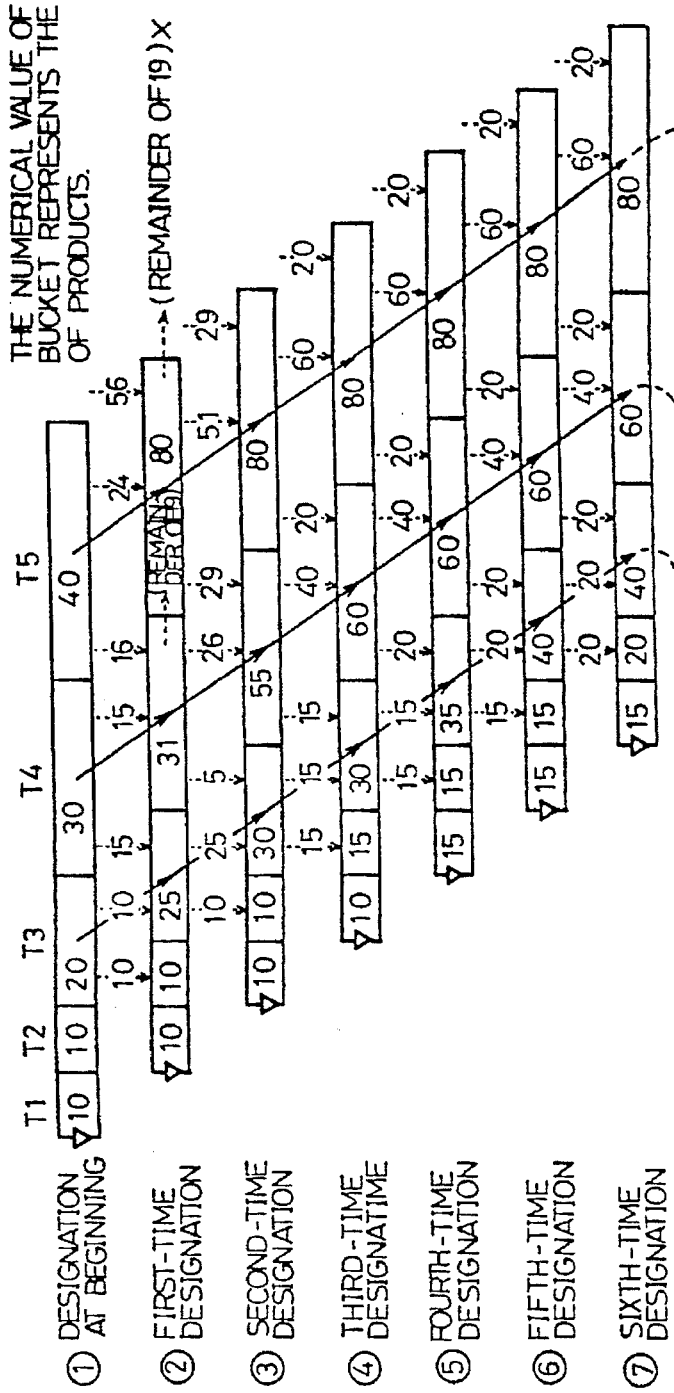
FIGS. 7(a)–(c) are diagrams showing an operation of the production request time frame generating module of Embodiment 1.
Figure 7C:
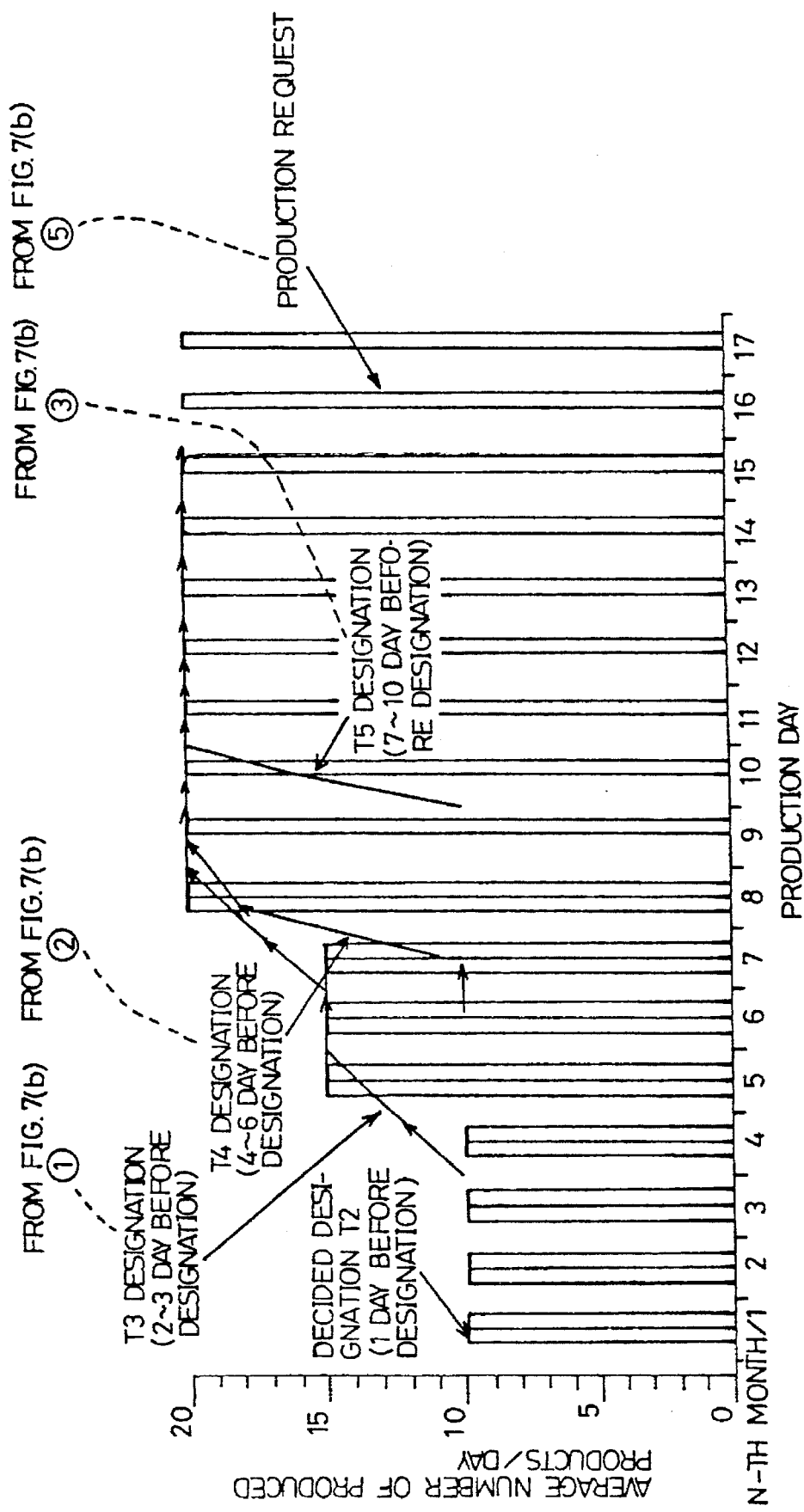

FIGS. 7(a), 7(b) and 7(c) show a transition operation for production designation according to production request modification in Embodiment 1. For this example, lengths of time buckets from T1 to T5 are expressed as "|T1|=|T2|=1 day, |T3|=2 days, |T4|=3 days, and |T5|=4 days" and production designation is updated every day. This case shows the transition of production designation according to the production designation time frame when production requests after the first-time update are modified from the initial production request. The conditions are the same as those shown in FIGS. 3(a) and 3(b) (however, the capacity conditions are different as follows: m1=20, m2=20, m3=40, m4=60, and m5=80). The production request increases by 5 products from the fifth day and 10 products from the eighth day compared with the initial request. As shown by a graph at the bottom of FIGS. 7(a), 7(b) and 7(c), the average designated number of products to be produced obtained by dividing the designated production quantity for each undecided time bucket is shown by a polygonal line graph for each time bucket and the decided designation (T2 time bucket) according to decided time buckets and the modified production requests are shown by bar graphs. From these graphs, it is found that adjacent time buckets in view of time follow the modified production request relatively gently though the decided production designation corresponds to the request. However, earlier time bucket quickly rises and follows the production request. Therefore, the production designation has a consistency as a whole.

Five problems of the existing production planning system are listed in the section of "Description of the Related Art". The following shows how the present invention solves each problem. As shown in FIG. 2, there are five time buckets from T1 to T5 whose lengths are expressed as "|T1|=|T2|=1 day", "|T3|=2 days", "|T4|=4 days", and "|T5|=8 days". Therefore, the length increases as the time goes further. As shown by the existing production plan in FIG. 14, production preparation can be made properly by this type of time frame because planning of line working and securing of production capacity are performed with macro data. That is, as pointed out in the above Problem 1, the amount of data to be stored as production plan can be saved without preparing a too minute plan.

Moreover, fluctuant production requests are taken into the system according to elapse of time to update production designation. In this case, to approximate the latest production request, the designated quantity of each old production designation time bucket is allocated to each of a series of new production designation time buckets divided and recombined under the conditions specifying the designation modifiable range by using the discrepancy between new and old time frames due to the difference between the points of time for production designation. The following is the description of the time bucket dividing and recombining operation. When the latest production designation time frame is updated to the latest time frame, time buckets are divided. The value 15 in the time bucket T3 of the latest time frame is divided into 9 and 6 and the value 30 in the time bucket T4 is divided into 15 and 15. To allocate these values to the latest time frame, time buckets are recombined. For the latest time frame T3, values 6 and 15 are recombined and the value 21 is allocated. When time buckets are divided into two groups and if more values are allocated to the first group, the designated delivery deadline of the type of product is hastened. However, if more values are allocated to the second group, the designated delivery deadline is delayed. The rate for allocating values to the first group or the like is included in the conditions in the condition storing module. By properly specifying the conditions, an executable production plan can be automatically generated without modification checking. That is, the above Problem 2 is solved and the time used for production plan modification checking can be shortened. By shortening the modification checking time, the above Problems 3 and 4 are solved and an executable production plan adequately considering demand forecast and received order information can be made. Moreover, troubles can be decreased including decrease of productivity of production lines and affiliated factory and delay of delivery deadline to users.

This type of time frame quantitatively shows the modification degree of product delivery deadline. For example, when dividing the time bucket T3 of the latest production designation time frame in FIG. 5, the upper limit of the first-half dividing quantity is assumed as 50%. In this case, it is understood that the the upper limit of accumulated production designations up to T3 in the latest production designation time frame, in other words, the upper limit of "T1+T2+T3" is "10+15+30×0.5=40" according to the designated quantity of the latest production designation time frame. The accumulated designated quantity is important for part machining lines and affiliated factories. Therefore, it is possible to correspond to the fluctuation of production requests without disorder of production by using the quantitative modification width and giving, for example, the upper limit information for modification to production lines. This solves the above Problem 5.

The following is the description of the successively-deciding production planning system showing Embodiment 2 of the present invention. FIG. 8 is production request data and a production request time frame allocated by the production request time frame generating module by using the data as an input. For this example, all time buckets are one week. That is, |T1|=|T2|=|T3|= . . . =|Tn|=one week. Therefore, the production plan is updated every week for this example. Types of products to be produced are expressed by three levels of higher rank, medium rank, and lower rank. The production quantity level in time buckets is classified into lower-rank type of product level (types of products A, B, C, D, and E) for T1 and T2, medium-rank type of product level (types of products "a" and "b) for T3, and higher-rank type of product level (type of product @) for T4. The production request information is allocated in the form Summarized to the type of time frame. The Successively-deciding production planning system of Embodiment 2 has a time frame comprising time buckets having the relationship of "T1=T2= . . . =Tn", in which a time bucket with a low certainty further allocated is expressed as the quantity of each higher-rank type of product which is a group of a plurality of lower-rank types of products in order to designate production. FIG. 8 quantitatively shows the modification degree of lower-rank types of products. In FIG. 8, the number of higher-rank types of products for the fourth week of April is 350. Therefore, it is found that the upper-limit value is 350 even if the number of lower-rank types of products is hereafter determined through the type-of-product dividing operation. This solves the above Problem 5 and makes it possible to correspond to the production request fluctuation without disorder of production by using the quantitative modification width and giving production arrangement designation information showing the certainty such as previous notice or decision to production lines.

Figure 9A:

FIGS. 9(a) and 9(b) show conditions in the condition storing module. In FIGS. 9(a) and 9(b), when the higher-rank type of product level shifts to the lower-rank type of product level, the quantity of higher-rank type of product is divided into the designated production quantity of lower-rank type of product according to the ratio of required production quantity of lower-rank type of product. For example, the first and second expressions for deciding the time bucket T2 are described below.

$$P2A=(Y2A/Y2a) \times Q5a, \text{ Where, } Y2a=Y2A+Y2B$$

$$P2B=(Y2B/Y2a) \times Q3a$$

Where, "a" is a higher-rank type of product belonging to the group of the type of product A and the type of product B. Pij represents the production quantity of the time bucket "i" and the type of product "j" of the latest production designation time frame (after updated), Qij represents the production quantity of the time bucket "i" and the type of product "j" of the latest production designation time frame (before updated), and Yij represents the production quantity of the time bucket "i" and the type of product "j" of a production request time frame. Thus, in the above expressions, the quantity of the type of product "a" of the third time bucket of the latest production designation is divided with the ratio of the required production quantity of the type of product A to that of the type of product B of the second time bucket of the production request time frame this time.

FIG. 10(a) and 10(b) shows an operation algorithm of the production designation time frame updating module. For the time frame in FIGS. 10(a) and 10(b), the updating operation is performed by collating time buckets with the contents in the condition storing module in order of time bucket number starting with the smallest one. Therefore, the time bucket number is specified as "1" in the first step (Processing 1). Then, it is checked if the time bucket is already decided. If so, the processing for the next time bucket is performed (Processing 2). Then, in Processing 3, types of products not updated in the time bucket currently processed are detected. In Processing 4, the "type-of-product dividing operation" is performed according to the conditions in the condition storing module. When allocation of all types of products in the time bucket are completed, the difference between the designated production quantity and the required production quantity is transferred to the required production of the next time bucket as a request remainder. In Processing 6, it is checked if there is any time bucket in which types of products are not allocated. When allocation is performed for all time buckets, the processing ends. If there is any time bucket in which types of products are not allocated, the time bucket number is increased by "1" and the same processing is repeated from Processing 2.

FIG. 11 shows an operation of the production designation time frame updating module according to the conditions in FIGS. 9(a) and 9(b) and the operation algorithm in FIGS. 10(a) and 10(b). In Items *1 and *2 of the dividing operation, the quantity 150 of the type of product "a" of the time bucket T3 in the latest production designation time frame is divided into the required material quantities 90 and 60 of the types of products A and B of the time bucket T2 in the production request time frame.

FIGS. 12(a) and 12(b) show part constitution information and part arrangement information, and operations of the required material quantity calculating module and arrangement information generating module according to the information. The part constitution information shows how many parts of each type are necessary for each type of product. The part arrangement information shows the timing when the decided part arrangement or previously-notified part arrangement should be outputted. That is, it is shown that the decided information for the part 3 is designated by using the quantity of the time bucket T2 and the previously-notified information is designated by using the quantity of the time bucket T3. Then, the arranged quantity calculation for the time bucket T2 or the part 3 of the arrangement designation information is described in Item *2 of the required part quantity calculation and arrangement designation information generation. It is possible to calculate with the part constitution information that one part 3 is used for the type of product A and the type of product D respectively. Therefore, the required number of parts 3 comes to "100× 1+20 ×1=120" because the quantity of the type of product A is 100 and that of the type of product D is 20 in the time bucket T2 of the latest production designation time frame. In the time bucket T2, arrangement of the part 3 is designated as decided arrangement according to the part arrangement information. The following is the description of an example for generation of previously-notified information using Item *3 in FIG. 12(a) and 12(b). The required number of parts 3 is calculated as "150×1+200×1=350" by using the quantity of the type of product "a" and that of the type of product "b" in the time bucket T3 of the latest production designation time frame. Because the above expression shows the upper limit of the number of parts 3 when the production plan is modified in future, previous notice is executed by using the information. It is possible to decrease the amount of calculation for part development with a computer and the amount of the part constitution information depending on on the way of having the part constitution information. In FIGS. 12(a) and 12(b), the common part 0 of all parts is entered as a child part of the type of product @. The part 0 is a child part of all other types of products. When the decided arrangement is performed in the time bucket T4, the part 0 is not entered as a child part of the types of products "a", b", A, B, C, and D because the information on the part 0 is unnecessary for the subsequent processings (processings of time buckets T1, T2, and T3). This way of having the part constitution information makes it possible to decrease the amount of calculation for part development with a computer and the amount of part constitution information. Moreover, it is possible to execute the decided arrangement of common parts and that of dedicated parts at a proper timing by combining the part constitution information with the part arrangement information.

For this embodiment, the designated production quantity is updated through proportional distribution of production requests when dividing the production quantity of higher-rank type of product into the production quantity of each lower-rank type of product. However, it is possible to define another method. Moreover, a specifiable upper-limit value is shown when showing previously-notified information in FIGS. 12(a) and 12(b). However, it is also possible to show the upper-limit value together with lower-limit information or an expected value. Thus, it is possible to give more effective information to production lines as previously-notified information and decrease of disorder frequency of production lines can be expected.

As described above, for the time frame of Embodiment 2, the production plan with a lower certainty of the time bucket further allocated is expressed as the quantity of each higher-rank type of product which is a group of a plurality of lower-rank types of products. The production request time frame generating module 2 (FIGS. 1(a) and 1(b)) is activated by the time transition controlling module 1 for commanding the point of time for deciding a product production plan and data for the required quantity of each type of product is allocated to each of a series of time buckets from T1 to Tn representing a product production period. The conditions for dividing the production quantity of higher-rank type of product into the quantity of each lower-rank type of product is described in the condition storing module 3. The production designation time frame updating module 4 collates the received time frame with the production designation time frame representing the latest production designation and the description contents in the condition storing module 3 to perform the "type-of-product dividing operation" in the time frame and shifts the time frame to the production designation time frame representing the next production designation including the decided production designation. The required material quantity calculating module 6 receives the production designation time frame from the production designation time frame updating module 4 before collating the received time frame with the contents in the part constitution information storing module 5 for describing the subordination between part groups constituting a product and computing the required number of component parts necessary for actual production arrangement. The part arrangement information storing module 7 stores the information on the decided arrangement period and previously-notified arrangement period for each type of part. The arrangement designation information generating module 8 generates designation information to be given to outside as decided or previously-notified information by using the contents in the part arrangement information storing module 7 and the required number of component parts developed above.

Figure 13:
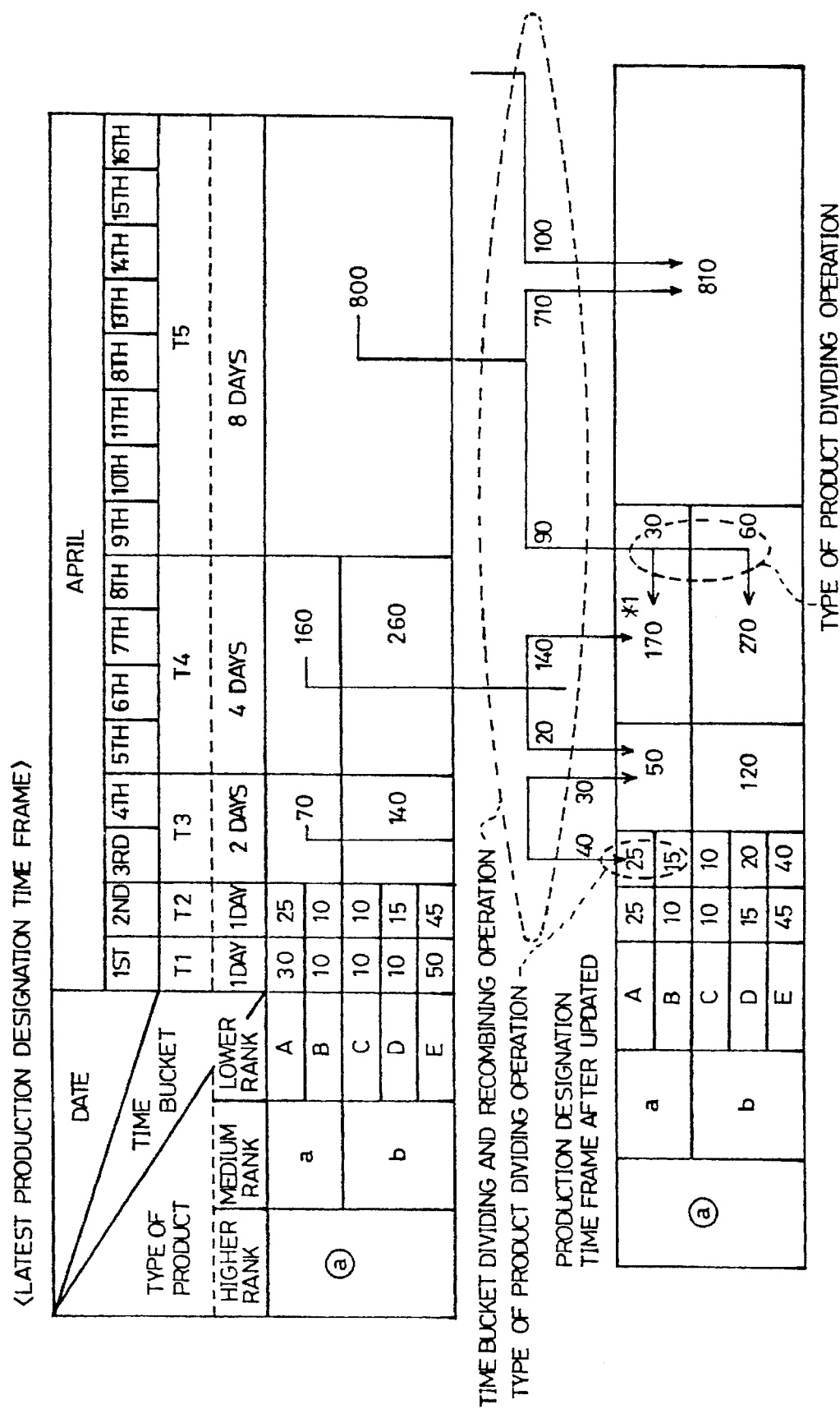
FIG. 13 is a diagram showing an operation of Embodiment 3.

The following is the description of Embodiment 3 of the present invention. Embodiment 3 performs an operation generated by combining the "time bucket dividing and recombining operation" described in Embodiment 1 with the "type of product dividing operation" described in Embodiment 2. FIG. 13 shows the operation of Embodiment 3. In the updated production designation time frame, the quantity 170 in Item *1 is obtained by adding the second half quantity 140 obtained by dividing the quantity of the time bucket T4 of the latest production designation time frame to the quantity 30 obtained by dividing the first half quantity 90 obtained by dividing the quantity 800 of the time bucket T5.

The conditions for dividing the production quantity of higher-rank type of product into the quantity of each lower-rank type of product and the conditions for modifying the production quantity in the time frame are described In the condition storing module 3 (FIGS. 1(a) and 1(b)) of Embodiment 3. The production designation time frame updating module 4 collates the received time frame with the production designation time frame representing the latest production designation and the description contents in the condition storing module 3 to perform the "time bucket dividing and recombining operation" and the "type-of-product dividing operation" and shifts the time frame to the production designation time frame representing the next production designation including the decided production designation. Embodiment 3 is the type made by combining Embodiment 1 with Embodiment 2. That is, the successively-deciding production planning system of this embodiment has a time frame comprising time buckets having the relationship of "$|T1|\leq|T2|\leq \ldots \leq|Tn-1|<|Tn|$" in which further portion with lower certainty of a time schedule representing a production period has larger time interval, allocates a production quantity to each time bucket, expresses further allocated time bucket with lower certainty as the quantity of each higher-rank type of product which is a group of a plurality of lower-rank types of products, and designates production. Moreover, the system takes in fluctuant production requests according to elapse of time and updates production designation. In this case, the system updates the production designation by combining the "time bucket dividing and recombining operation" and the "type-of-product dividing operation". That is, to approximate the latest production request, the system divides and recombines the designated quantity of each old production designation time bucket by using the discrepancy between new and old time frames due to the difference between the points of time for production designation under the conditions specifying the designation modifiable range of designation, divides the quantity of higher-rank type of product into the quantity of each lower-rank type of product under the conditions specifying the condition for dividing into the quantity of each lower-rank type of product, and allocates the quantity to each new production designation time bucket. As known from already described examples, the time bucket dividing and recombining operation make it possible to disuse Checking 1 in FIGS. 15(a) and 15(b) or checking of the product quantity level and automatically generate a production plan meeting the conditions. The type-of-product dividing operation makes it possible to disuse Checking 2 in FIGS. 15(a) and 15(b) or the checking of the part quantity level such as the arranged quantity of common parts and automatically generate a production plan meeting the conditions. It is possible to realize a system for automatically obtaining a production plan having a more-perfect modification checking procedure by combining these two operations.

As described above, the successively-deciding production planning systems of the first to third inventions make it possible to fluctuate further type of product and production quantity. Moreover, these systems have the advantages that an executable production plan following the fluctuation of demand forecast and received order information and having the overall consistency can be made because they consist of a system for narrowing down the fluctuation range according to the production executable conditions as the time elapses, that the existing calculation with a computer for the simulation for execution possibility evaluation of a production plan modification plan is unnecessary, that disorder of production lines can be prevented because the production plan uncertainty is quantified and the point of time for decision is clarified, and thereby effective arrangement designation information such as previous notice or decision can be given to production lines, and that production plan modification can be automated which must manually have been performed by operators.

What is claimed:

1. A computerized production planning system for producing a quantity of each type of a plurality of types of products, the system comprising:

means for generating a time frame having a series of time buckets;

means for calculating, for each time bucket of the generated time frame, an upper limit and a lower limit of a fluctuation range as a function of production quantities for each type of product to be produced, the upper limit defining a highest quantity that is allocatable to the time bucket, and the lower limit defining a lowest quantity that is allocatable to the time bucket, the upper and lower limits for each time bucket being variable;

means for allocating an acceptable quantity of each type of product to each time bucket according to the fluctuation range of the time bucket;

means for producing the acceptable quantity of each type of product that is allocated to at least one of the series of time buckets; and means for periodically operating the means for generating a time frame, the means for calculating, and the means for allocating an acceptable quantity.

2. The computerized production planning system of claim 1, wherein the means for calculating the upper limit and the lower limit of the fluctuation range includes means for separately determining the upper limit and the lower limit according to at least one of a requested quantity of production, and a previously planned quantity of production.

3. A successively-deciding production planning system, comprising:

time transition controlling means for issuing a command that indicates an update time for deciding a production plan;

production request time frame generating means for allocating, upon receipt of the issued command, a requested quantity of each type of product to each time bucket of a series of time buckets from T1 to Tn, the series of time buckets defining a production request time frame that represents a period for producing products in accordance with a product request input;

condition storing means for describing modifiable conditions on the production quantity of each type of product;

production designation time frame updating means for receiving the production request time frame defined by the production request time frame generating means, and for combining the received production request time frame with a previous production designation time frame representing a previous production designation and with the modifiable conditions from the condition storing means, the production designation time frame updating means including means for calculating, for each time bucket of the series of time buckets, an upper limit and a lower limit of a fluctuation range as a function of production quantities for each type of product to be produced, and means for allocating a quantity within the fluctuation range to each of the time buckets in order to generate a new production designation time frame representing a new production designation, the upper limit defining a highest quantity that is allocatable to the time bucket, and the lower limit defining a lowest quantity that is allocatable to the time bucket, the upper and lower limits for each time bucket being variable;

part constitution information storing means for describing a subordination between part groups constituting a product;

required material quantity calculating means for receiving the new production designation time frame from the production designation time frame updating means and collating the received time frame with the contents in the part constitution information storing means to compute a number of component parts necessary for actual production arrangement;

part arrangement information storing means for describing part arrangement information including a lead time for purchasing parts;

arrangement designation information generating means for generating a designation output having the number of component parts and the part arrangement information; and producing means for producing a quantity of each type of product according to the generated designation output.

4. A successively-deciding production planning system according to claim 3, wherein the modifiable conditions described by the condition storing means includes production quantity dividing conditions, and wherein the means for calculating includes means for defining the upper and lower limits of the fluctuation range according to the production quantity dividing conditions.

5. A successively-deciding production planning system according to claim 3, wherein the time widths of the time buckets of the production request time frame become larger for production periods further in the future.

6. A successively-deciding production planning system according to claim 3, wherein the time transition controlling means issues the command on one of a daily basis and a weekly basis.

7. A successively-deciding production planning system according to claim 3, wherein the condition storing means further includes conditions indicating that the quantity to be allocated to particular time buckets of the new production designation time frame are made to be constant.

8. A successively-deciding production planning system according to claim 3, wherein the upper and lower limits of each fluctuation range are set differently from each other by the means for calculating.

9. A successively-deciding production planning system according to claim 3, wherein the arrangement designation information generating means includes means for outputting the upper and lower limits of the fluctuation range for each time frame for each type of product.

10. A successively-deciding production planning system according to claim 3, wherein the arrangement designation generating means includes means for outputting information showing a certainty value for the number of parts for each type of product for each time bucket.

11. A successively-deciding production planning system according to claim 3, wherein the arrangement designation information generating means includes means for identifying parts of products with sequential numbers.

12. A successively-deciding production planning system according to claim 3, wherein each time bucket receives a plurality of lower-rank quantities, each corresponding to a lower-rank type of product to be produced, a group of lower-rank types forming a higher-rank type of product to be produced, the modifiable conditions stored in the condition storing means includes rank information specifying the higher-rank type of product to be produced and conditions for dividing the higher-rank type of product into the lower-rank types of products to be produced, and the production designation time frame updating means includes means for performing a type-of-product dividing operation for dividing the quantity stored in a time bucket for the higher-rank type of product to be produced into a plurality of quantities of each lower-rank type of product to be produced.

13. A successively-deciding production planning system according to claim 12, wherein each time bucket has a time interval that is equally set and the production designation time frame updating means includes means for allocating the quantity of the higher-rank type of product to one of the time buckets.

14. A successively-deciding production planning system according to claim 12, wherein the time transition controlling means issues the command on one of a daily basis and a weekly basis.

15. A successively-deciding production planning system according to claim 12, wherein the condition storing means further includes conditions indicating that the quantity to be allocated to particular time buckets of the new production designation time frame are made to be constant.

16. A successively-deciding production planning system according to claim 12, wherein the upper and lower limits of each fluctuation range are set differently from each other by the means for calculating.

17. A successively-deciding production planning system according to claim 12, wherein the arrangement designation information generating means includes means for outputting the upper and lower limits of the fluctuation range for each time frame for each type of product.

18. A successively-deciding production planning system according to claim 12, wherein the arrangement designation generating means includes means for outputting information showing a certainty value for the number of parts for each type of product for each time bucket.

19. A successively-deciding production planning system according to claim 12, wherein the arrangement designation information generating means includes means for identifying parts of products with sequential numbers.

20. A successively-deciding production planning system according to claim 12, wherein the time widths of the time buckets of the production request time frame becomes larger for production periods further in the future.

21. A successively-deciding production planning system according to claim 3, wherein the modifiable conditions of the condition storing means includes rank information specifying the higher-rank type of product to be produced, conditions for dividing the higher-rank type of product into the lower-rank types of products to be produced, and conditions for changing a production quantity, and the production designation time frame updating means includes means for performing a type-of-product dividing operation for dividing the higher-rank type of product to be produced into a plurality of quantities of each lower-rank type of product to be produced, and means for performing the operations for dividing and recombining the time buckets to fluctuate at least one of the quantity of the type of product to be produced.

22. A successively-deciding production planning system according to claim 21, wherein the time widths of the time buckets of the production request time frame become larger for production periods further in the future, and the production designation time frame updating means includes means for allocating the quantity of the higher-rank type of product to one of the time buckets.

23. A successively-deciding production planning system according to claim 21, wherein the time transition controlling means issues the command on one of a daily basis and a weekly basis.

24. A successively-deciding production planning system according to claim 21, wherein the condition storing means further includes conditions indicating that the quantity to be allocated to particular time buckets of the new production designation time frame are made to be constant.

25. A successively-deciding production planning system according to claim 21, wherein time frame patterns before and after updating are set differently from each other.

26. A successively-deciding production planning system according to claim 21, wherein the arrangement designation information generating means includes means for outputting the upper and lower limits of the fluctuation range for each time frame for each type of product.

27. A successively-deciding production planning system according to claim 21, wherein the arrangement designation generating means includes means for outputting information showing a certainty value for the number of parts for each type of product for each time bucket.

28. A successively-deciding production planning system according to claim 21, wherein the arrangement designation information generating means includes means for identifying parts of products with sequential numbers.

29. The successively deciding production planning system of claim 3, wherein the means for calculating the upper limit and the lower limit of the fluctuation range includes
means for separately determining the upper limit and the lower limit according to at least one of the production request time frame, and the previous production designation time frame.

30. A computerized production planning method for producing a plurality of types of products, the method comprising the steps of:
generating a time frame having a series of time buckets;
calculating, for each time bucket of the generating time frame, an upper limit and a lower limit of a fluctuation ranges as a function of production quantities for each type of product to be produced, the upper limit defining a highest quantity that is allocatable to the time bucket, and the lower limit defining a lowest quantity that is allocatable to the time bucket, the upper and lower limits for each time bucket being variable;
allocating an acceptable quantity of each type of product to each time bucket according to the fluctuation range of the time bucket; and
producing the acceptable quantity of each type of product that is allocated to at least one of the series of time buckets.

31. The computerized production planning method of claim 30, wherein the means for calculating the upper limit and the lower limit of the fluctuation range includes
means for separately determining the upper limit and the lower limit according to at least one of a requested quantity of production, and a previously planned quantity of production.

32. A computerized method for producing a plurality of types of products comprising the steps of:
controlling an updating time;
generating a time frame having a series of time buckets from T1 to Tn representing a period for producing products in accordance with product request input, activated at the updating time;
referencing stored modifiable conditions for the production quantity of each type of product;
receiving the production request time frame defined in the step of generating a time frame, and combining the received production request time frame with a previous production designation time frame representing a previous production designation and with the modifiable conditions, the step of receiving and combining including the steps of
calculating, for each time bucket of the series of time buckets, an upper limit and a lower limit of a fluctuation range as a function of production quantities for each type of product to be produced, and
allocating a quantity within the fluctuation range of each of the time buckets in order to generate a new production designation time frame representing a new production designation, the upper limit defining a highest quantity that is allocatable to the time bucket, and the lower limit defining a lowest quantity that is allocatable to the time bucket, the upper and lower limits for each time bucket being variable;
referencing a subordination description between a plurality of part groupings of product types;
receiving the new production designation time frame from the step of receiving, combining, and dividing and recombining, and collating the received new production designation time frame with a subordination description from the step of referencing the subordination description to compute a number of component parts necessary for an actual production arrangement;
referencing part arrangement information including a lead time for purchasing parts;
generating and outputting a designation output having the part arrangement information; and
producing a quantity of each type of product according to the generated and outputted designation output.

33. The computerized method of claim 32, wherein the means for calculating the upper limit and the lower limit of the fluctuation range includes
means for separately determining the upper limit and the lower limit according to at least one of the received production request time frame, and the previous production designation time frame.

34. A computerized production planning system for producing a quantity of products comprising:
means for generating a time frame data structure, the time frame having a series of discrete time intervals, each time interval having a length and corresponding to a group of at least one product to be produced;
means for changing at least one of the length and the corresponding group of a time interval of the generated time frame data structure according to new product request information, existing product request information, and preset conditions;
means for calculating, for each time interval of the generated time frame data structure, an upper limit and a lower limit of a fluctuation range as a function of production quantities for each product in the group, the upper limit defining a highest quantity that is allocatable to the time bucket, and the lower limit defining a lowest quantity that is allocatable to the time bucket, the upper and lower limits for each time bucket being variable;
means for allocating a quantity for each product in the group to each time interval of each time frame according to the fluctuation range;

means for producing the quantity for each type of product in the group that is allocated to at least one time interval of at least one time frame; and means for periodically operating the means for generating, the means for changing, the means for calculating, and the means for allocating.

35. The computerized production planning system of claim 34, wherein the means for calculating the upper limit and the lower limit of the fluctuation range includes means for separately determining the upper limit and the lower limit according to at least one of the new product request information, and the existing product request information.

36. A computerized production planning system comprising:

means for generating a time frame having a series of time intervals, each time interval having a length and corresponding to a group of at least one product type to be produced;

means for storing production quantity conditions;

means for calculating first quantities for each time interval according to the production quantity conditions, the calculated first quantities representing new product request information;

means for changing at least one of the length and the corresponding group of a time interval according to the production quantity conditions;

means for calculating, for each time interval of the generated time frame, an upper limit and a lower limit of a fluctuation range as a function of production quantities for each product of the corresponding group, the upper limit defining a highest quantity that is allocatable to the time bucket, and the lower limit defining a lowest quantity that is allocatable to the time bucket, the upper and lower limits for each time bucket being variable;

means for describing subordination information for a plurality of part groupings of product types;

means for calculating second quantities for the time intervals according to the subordination information and the first quantities, the calculated second quantities representing quantities of component parts necessary for producing each product in the corresponding group;

means for describing part information including a lead time for purchasing parts, a required number of component parts and part arrangement information;

means for calculating third quantities for the time intervals according to the part information and the second quantities, the calculated third quantities representing final planned production quantities;

means for outputting a production plan including the third quantities; and means for producing at least one of the product types according to the outputted production plan.

37. The computerized production planning system according to claim 36, further including means for periodically operating the system for each production period of a plurality of production periods.

38. The computerized production planning system according to claim 36, wherein the series of time intervals includes a plurality of position numbers, each time interval having a position number.

39. The computerized production planning system according to claim 38, wherein each time frame has first and second time intervals, the position number of the first time interval being less than the position number of the second time interval, and the length of the first time interval being smaller than the length of the second time interval.

40. The computerized production planning system according to claim 36, wherein the means for changing further includes means for increasing the length of a time interval of a time frame.

41. The computerized production planning system according to claim 36, wherein the means for changing further includes means for enlarging a group of product types of a time interval.

42. The computerized production planning system of claim 36, wherein the means for calculating the upper limit and the lower limit of the fluctuation range includes means for separately determining the upper limit and the lower limit according to at least one of the production quantity conditions, and the new product request information.

43. A computerized production planning method for producing a quantity of products comprising the steps of:

generating a time frame data structure, the time frame data structure having a series of discrete time intervals, each time interval having a length and corresponding to a group of at least one product to be produced;

changing at least one of the length and the corresponding group of a time interval of the generated time frame data structure according to new product request information, existing product request information, and preset conditions;

calculating, for each time bucket of the generated time frame, an upper limit and a lower limit of a fluctuation range as a function of production quantities for each type of product to be produced, the upper limit defining a highest quantity that is allocatable to the time bucket, and the lower limit defining a lowest quantity that is allocatable to the time bucket, the upper and lower limits for each time bucket being variable;

allocating a quantity for each product in the group to each time interval of each time frame according to the fluctuation range; and producing the quantity for each product in the group that is allocated to at least one time interval of at least one time frame.

44. The computerized production planning method of claim 43, wherein the means for calculating the upper limit and the lower limit of the fluctuation range includes means for separately determining the upper limit and the lower limit according to at least one of the new product request information, and the existing product request information.

45. A computerized production planning method comprising:

generating a time frame having a series of time intervals, each time interval having a length and corresponding to a group of at least one product type to be produced;

storing production quantity conditions;

calculating first quantities for each time interval according to the production quantity conditions;

changing at least one of the length and the group of a time interval according to the production quantity conditions according to new product request information, existing product request information, and the stored production quantity conditions;

calculating, for each time bucket of the generated time frame, an upper limit and a lower limit of a fluctuation range as a function of production quantities for each product in the corresponding group, the upper limit defining a highest quantity that is allocatable to the time bucket, and the lower limit defining a lowest quantity that is allocatable to the time bucket, the upper and lower limits for each time bucket being variable;

describing subordination information for a plurality of part groupings of product types;

calculating second quantities for the time intervals according to the subordination information and the first quantities, the calculated second quantities representing quantities of component parts necessary for producing each product in the corresponding group;

describing part information including a lead time for purchasing parts, a required number of component parts and part arrangement information;

calculating third quantities for the time intervals according to the part information and the second quantities, the calculated third quantities representing final planned production quantities;

outputting a production plan including the third quantities; and producing at least one of the product types according to the outputted production plan.

46. The computerized production planning method according to claim 45, further the step of periodically operating the system for each production period of a plurality of production periods.

47. The computerized production planning method according to claim 45, wherein the step of changing further includes the step of increasing the length of a time interval of a time frame.

48. The computerized production planning method according to claim 45, wherein the step of changing further includes the step of enlarging a group of product types of a time interval.

49. The computerized production planning method of claim 45, wherein the means for calculating the upper limit and the lower limit of the fluctuation range includes means for separately determining the upper limit and the lower limit according to at least one of the requested quantity of production, and the first quantities.

* * * * *